US011729581B2

(12) United States Patent
Lee et al.

(10) Patent No.: US 11,729,581 B2
(45) Date of Patent: *Aug. 15, 2023

(54) METHOD AND DEVICE FOR TRANSMITTING AND RECEIVING LOCATION INFORMATION IN NR V2X

(71) Applicant: LG Electronics Inc., Seoul (KR)

(72) Inventors: Jongyoul Lee, Seoul (KR); Jinwoo Kim, Seoul (KR); Hanbyul Seo, Seoul (KR); Seungmin Lee, Seoul (KR); Sunghoon Jung, Seoul (KR); Jaeho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 197 days.

This patent is subject to a terminal disclaimer.

(21) Appl. No.: 17/129,313

(22) Filed: Dec. 21, 2020

(65) Prior Publication Data
US 2021/0112375 A1     Apr. 15, 2021

Related U.S. Application Data

(63) Continuation of application No. 16/787,881, filed on Feb. 11, 2020, now Pat. No. 10,893,390, which is a
(Continued)

(30) Foreign Application Priority Data

Oct. 31, 2018 (KR) .................. 10-2018-0131792

(51) Int. Cl.
*H04W 4/00* (2018.01)
*H04W 4/029* (2018.01)
(Continued)

(52) U.S. Cl.
CPC ........... *H04W 4/029* (2018.02); *H04L 1/1819* (2013.01); *H04L 5/0055* (2013.01); *H04W 4/40* (2018.02); *H04W 92/18* (2013.01)

(58) Field of Classification Search
CPC ....... H04W 4/029; H04W 4/40; H04W 92/18; H04W 4/023; H04W 28/04; H04L 1/1819; H04L 5/0055; H04L 1/1812; Y02D 30/70
See application file for complete search history.

(56) References Cited

U.S. PATENT DOCUMENTS 7,054,635 B1 *   5/2006  Ritzen .................. H04W 16/08
                                                          455/63.2
7,668,124 B2     2/2010  Karaoguz
                         (Continued)

FOREIGN PATENT DOCUMENTS

CN       105898675       8/2016
CN       108400843       8/2018
                (Continued)

OTHER PUBLICATIONS

3rd Generation Partnership Project; Technical Specification Group Radio Access Network; "Evolved Universal Terrestrial Radio Access (E-UTRA); Radio Resource Control (RRC); Protocol specification (Release 14)," 3GPP TS 36.331 v14.0.0, dated Sep. 2016, 644 pages.
(Continued)

*Primary Examiner* — Stephen M D Agosta
(74) *Attorney, Agent, or Firm* — Fish & Richardson P.C.

(57) ABSTRACT

Provided herein are a method for receiving, by a first device, location information of a second device in a wireless communication system and a device for supporting the same. The method may include the steps of receiving a physical sidelink control channel (PSCCH) from the second device, and receiving location information of the second device
(Continued)

from the second device through a physical sidelink shared channel (PSSCH) related to the PSCCH.

16 Claims, 36 Drawing Sheets

Related U.S. Application Data continuation of application No. PCT/KR2019/014366, filed on Oct. 29, 2019.

(51) Int. Cl.
*H04W 4/40* (2018.01)
*H04L 1/1812* (2023.01)
*H04L 5/00* (2006.01)
*H04W 92/18* (2009.01)

(56) References Cited

U.S. PATENT DOCUMENTS

| | | | | |
|---|---|---|---|---|
| 9,125,107 | B1* | 9/2015 | McMullen | H04W 64/00 |
| 10,530,461 | B2 | 1/2020 | Sadiq et al. | |
| 2006/0293053 | A1* | 12/2006 | Zanaty | H04W 88/04 |
| | | | | 455/436 |
| 2009/0217119 | A1 | 8/2009 | Zhang et al. | |
| 2011/0103247 | A1 | 5/2011 | Chen et al. | |
| 2013/0288645 | A1* | 10/2013 | Zheng | H04W 76/14 |
| | | | | 455/411 |
| 2014/0098754 | A1* | 4/2014 | Luo | H04L 5/0073 |
| | | | | 370/329 |
| 2015/0304875 | A1* | 10/2015 | Axmon | H04W 56/0005 |
| | | | | 370/328 |
| 2016/0095074 | A1* | 3/2016 | Park | H04W 72/10 |
| | | | | 370/350 |
| 2016/0286374 | A1 | 9/2016 | Baghel et al. | |
| 2017/0110094 | A1* | 4/2017 | Kwon | G06F 3/011 |
| 2017/0150314 | A1* | 5/2017 | Hwang | H04W 4/06 |
| 2017/0150330 | A1* | 5/2017 | Kim | H04W 76/14 |
| 2017/0230959 | A1 | 8/2017 | Wu et al. | |
| 2017/0289733 | A1* | 10/2017 | Rajagopal | H04L 5/0087 |
| 2018/0014174 | A1 | 1/2018 | Zhou et al. | |
| 2018/0020387 | A1* | 1/2018 | Van Der Velde | |
| | | | | H04W 36/0072 |
| 2018/0070219 | A1 | 3/2018 | Khoryaev et al. | |
| 2018/0098323 | A1 | 4/2018 | Zhang et al. | |
| 2018/0098369 | A1 | 4/2018 | Yasukawa et al. | |
| 2018/0124682 | A1 | 5/2018 | Chae et al. | |
| 2018/0213379 | A1* | 7/2018 | Xiong | H04W 4/70 |
| 2018/0231648 | A1* | 8/2018 | Zhang | G01S 11/08 |
| 2018/0249518 | A1* | 8/2018 | Nguyen | H04W 72/0453 |
| 2018/0279275 | A1 | 9/2018 | Chen et al. | |
| 2018/0317123 | A1 | 11/2018 | Chen et al. | |
| 2018/0352411 | A1* | 12/2018 | Ryu | H04W 40/24 |
| 2019/0053267 | A1* | 2/2019 | Kim | H04W 72/0406 |
| 2019/0068312 | A1* | 2/2019 | Zhang | H04L 1/0002 |
| 2019/0090092 | A1 | 3/2019 | Hwang et al. | |
| 2019/0104512 | A1* | 4/2019 | Vura | H04W 72/048 |
| 2019/0174530 | A1* | 6/2019 | Kim | H04W 72/0446 |
| 2019/0191442 | A1* | 6/2019 | Lu | H04W 36/26 |
| 2019/0246253 | A1 | 8/2019 | Ryu et al. | |
| 2019/0281596 | A1* | 9/2019 | Adachi | H04W 72/04 |
| 2019/0335532 | A1* | 10/2019 | Kim | H04W 36/0022 |
| 2020/0106566 | A1* | 4/2020 | Yeo | H04W 28/04 |
| 2020/0228247 | A1 | 7/2020 | Guo et al. | |
| 2020/0260240 | A1* | 8/2020 | Lee | H04W 4/02 |
| 2020/0351057 | A1* | 11/2020 | Yeo | H04L 5/0087 |
| 2020/0351856 | A1* | 11/2020 | Yeo | H04L 27/2607 |
| 2020/0403737 | A1* | 12/2020 | Yeo | H04L 1/1861 |
| 2021/0384967 | A1* | 12/2021 | Durvasula | H04L 63/0892 |
| 2022/0039080 | A1* | 2/2022 | Khoryaev | H04W 4/40 |
| 2022/0086602 | A1* | 3/2022 | Ashraf | H04W 4/44 |
| 2022/0183002 | A1* | 6/2022 | Yeo | H04L 1/1607 |
| 2022/0201654 | A1* | 6/2022 | Lee | H04L 1/1812 |
| 2022/0232549 | A1* | 7/2022 | Yeo | H04L 5/0044 |
| 2022/0330261 | A1* | 10/2022 | Yeo | H04L 5/0053 |
| 2022/0417976 | A1* | 12/2022 | Park | H04L 5/0078 |

FOREIGN PATENT DOCUMENTS

| | | |
|---|---|---|
| CN | 108702730 | 10/2018 |
| EP | 3133842 | 2/2017 |
| JP | 2016531354 | 10/2016 |
| JP | 2018029323 | 2/2018 |
| JP | 2018513626 | 4/2019 |
| KR | 1020140128728 | 11/2014 |
| KR | 20160140756 | 12/2016 |
| KR | 20170138458 | 12/2017 |
| KR | 20170141471 | 12/2017 |
| WO | WO 2017103662 | 6/2017 |
| WO | WO2018133720 | 7/2018 |

OTHER PUBLICATIONS

InterDigital Inc., "Enhancement of Un Interface for NR Sidelink," R1-1811215, 3GPP TSG RAN WG1 Meeting #94, Chengdu, China, Oct. 8-12, 2018, 4 pages.
Office Action in Korean Appln. No. 10-2021-7022022, dated Apr. 28, 2022, 10 pages (with English translation).
Qualcomm Incorporated, "Discussion on Groupcast for NR V2X," R2-1814929, 3GPP TSG-RAN WG2 Meeting #103, Chengdu, China, Oct. 8-12, 2018, 5 pages.
Korean Office Action in Korean Appln. No. 10-2020-7002850, dated Feb. 15, 2021, 10 pages (with English translation).
Chinese Office Action in Chinese Appln. No. 201980004243.3, dated Feb. 18, 2021, 10 pages (with English translation).
Nokia, Nokia Shanghai Bell, "On Enhancements of LTE Un and NR Un to control NR sidelink," R1-1811431, 3GPP TSG RAN WG1 Meeting #94bis, Chengdu, China, Oct. 8-12, 2018, 4 pages.
Japanese Office Action in Japanese Appln. No. 2020-514504, dated Mar. 30, 2021, 5 pages (with English translation).
Notice of Allowance in Chinese Appln. No. 201980004243.3, dated Sep. 13, 2021, 8 pages (with English translation).
Extended European Search Report in European Appln. No. 19839311.8, dated May 8, 2020, 10 pages.
InterDigital Inc., Support of NR Sidelink Unicast and Groupcast, Rl-1811209, 3GPP TSG RAN WG1 Meeting #94bis, Chengdu, China, Oct. 8-12, 2018, 5 pages.
Office Action in Japanese Application No. 2021119471, dated Jul. 5, 2022, 7 pages (with English translation).
Vivo, "Physical layer procedure for NR sidelink," 3GPP TSG RAN WG1 Meeting #98bis, R1-1910217, Chongqing, China, Oct. 14-20, 2019, 25 pages.

* cited by examiner (a)

(b)

(a)

(b)

METHOD AND DEVICE FOR TRANSMITTING AND RECEIVING LOCATION INFORMATION IN NR V2X

CROSS-REFERENCE TO RELATED APPLICATIONS

This application is a continuation of U.S. application Ser. No. 16/787,881, filed on Feb. 11, 2020, which is a continuation pursuant to 35 U.S.C. § 119(e) of International Application No. PCT/KR2019/014366, with an international filing date of Oct. 29, 2019, which claims the benefit of Korean Patent Application No. 10-2018-0131792, filed on Oct. 31, 2018, the contents of which are all hereby incorporated by reference herein in their entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Meanwhile, sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Meanwhile, a receiving user equipment (UE) may determine its distance from a transmitting UE based on location information that is transmitted by the transmitting UE, and, then, the receiving UE may determine whether or not to perform HARQ feedback to the transmitting UE. Therefore, a method of a transmitting UE for efficiently transmitting its location information and a device for supporting the same need to be proposed.

According to an embodiment, provided herein is a method for receiving, by a first device (100), location information of a second device (200) in a wireless communication system. The method may include the steps of receiving a physical sidelink control channel (PSCCH) from the second device (200), and receiving location information of the second device (200) from the second device (200) through a physical sidelink shared channel (PSSCH) related to the PSCCH.

According to another embodiment, provided herein is a method for transmitting, by a second device (200), location information of the second device (200). The method may include the steps of transmitting a physical sidelink control channel (PSCCH) to a first device (100), and transmitting location information of the second device (200) to the first device (100) through a physical sidelink shared channel (PSSCH) related to the PSCCH.

According to another embodiment, provided herein is a first device (100) for receiving location information of a second device (200). The first device (100) may include one or more memories (104), one or more transceivers (106), and one or more processors (102) operatively connecting the one or more memories (104) and the one or more transceivers (106), wherein the one or more processors (102) may be configured to control the one or more transceivers (106) to receive a physical sidelink control channel (PSCCH) from the second device (200), and to control the one or more transceivers (106) to receive location information of the second device (200) from the second device (200) through a physical sidelink shared channel (PSSCH) related to the PSCCH.

A UE can efficiently perform SL communication.

DESCRIPTION OF EXEMPLARY EMBODIMENTS

In various embodiments of the present disclosure, it shall be interpreted that "I" and "," indicate "and/or". For example, "A/B" may mean "A and/or B". Additionally, "A, B" may also mean "A and/or B". Moreover, "AB/C" may mean "at least one of A, B and/or C". Furthermore, "A, B, C" may also mean "at least one of A, B and/or C".

Furthermore, in various embodiments of the present disclosure, it shall be interpreted that "or" indicates "and/or". For example, "A or B" may include "only A", "only B", and/or "both A and B". In other words, in various embodiments of the present disclosure, it shall be interpreted that "or" indicates "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A, which is a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
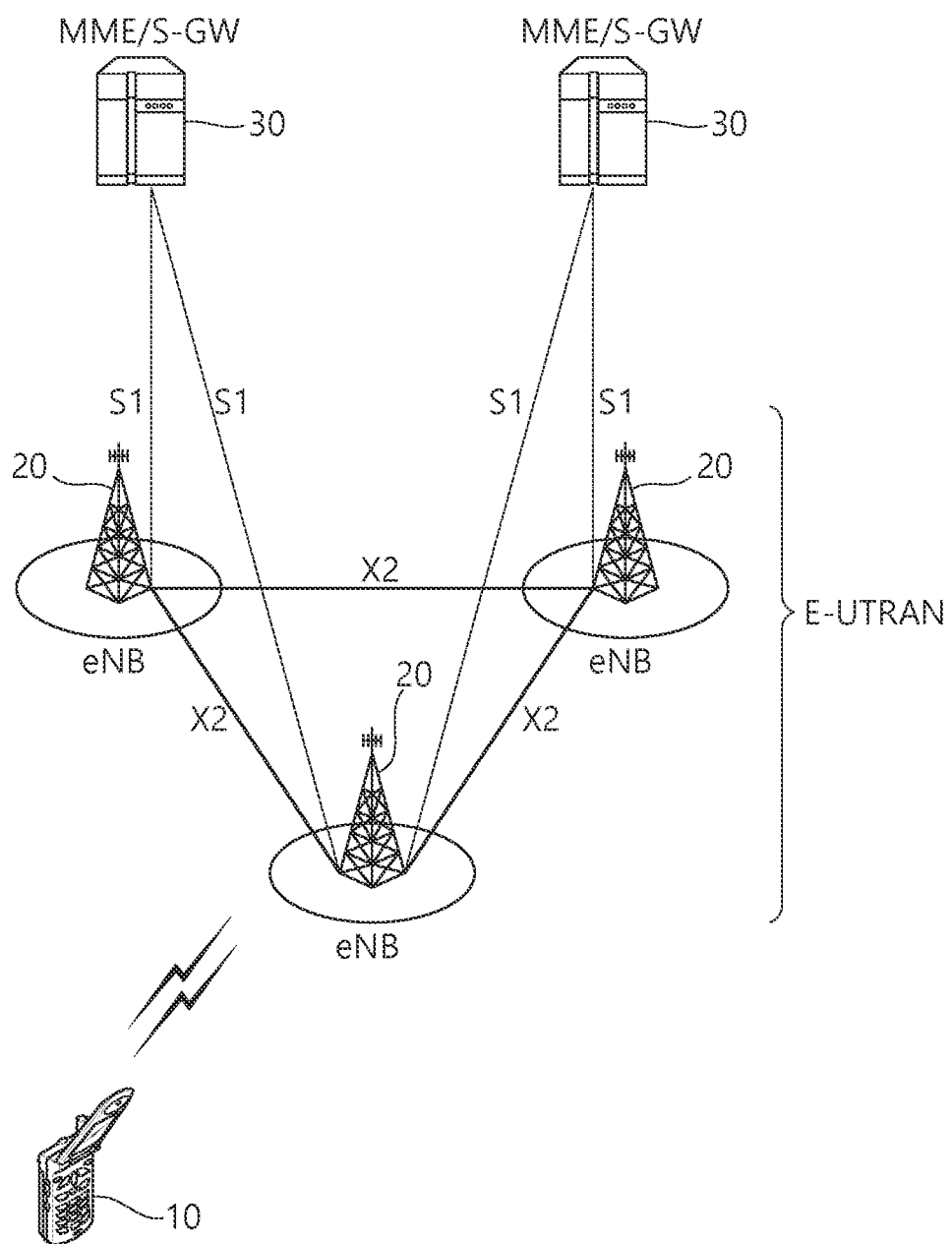
FIG. 1 shows a structure of an LTE system, in accordance with an embodiment of the present disclosure.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicates with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
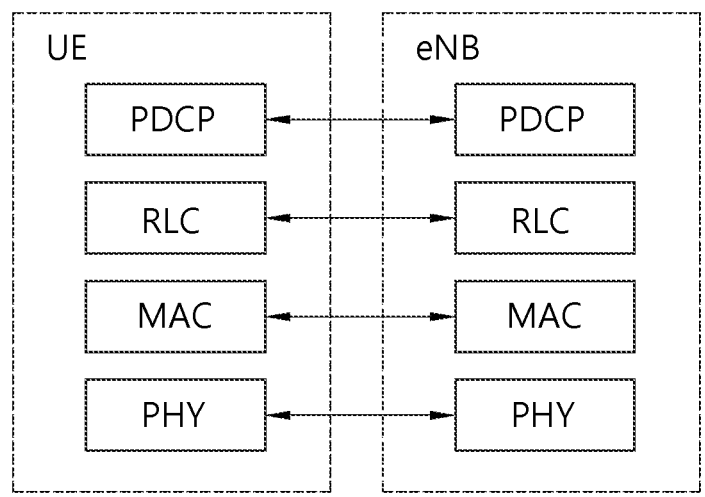
FIG. 2 shows a radio protocol architecture of a user plane, in accordance with an embodiment of the present disclosure.
Figure 3:
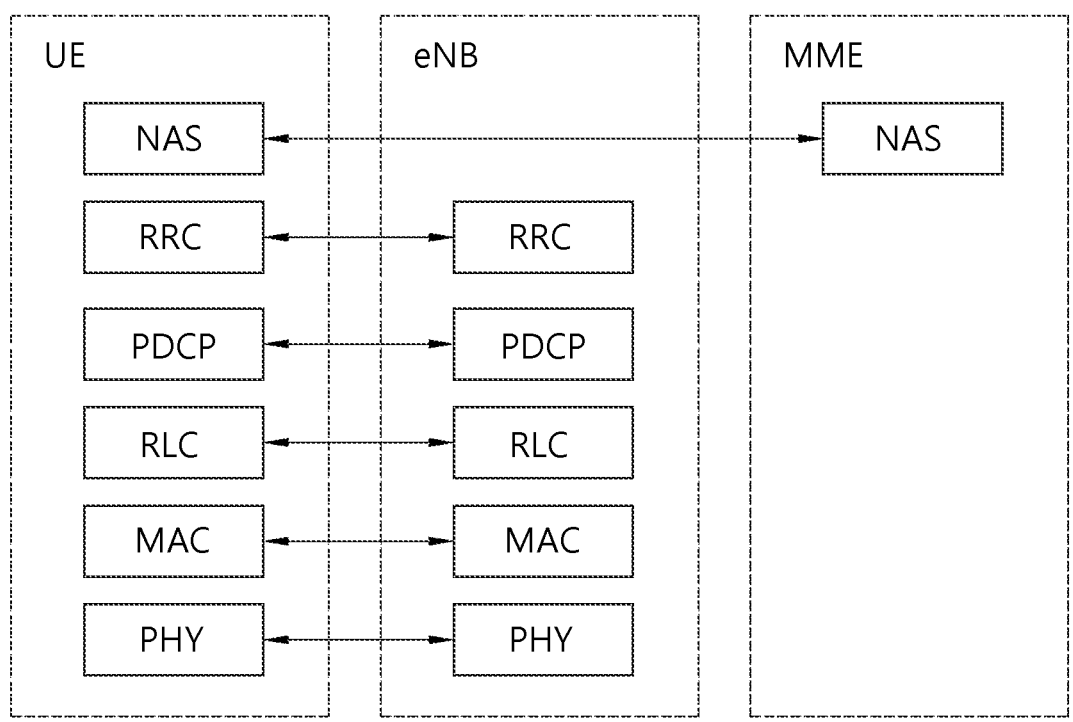
FIG. 3 shows a radio protocol architecture of a control plane, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
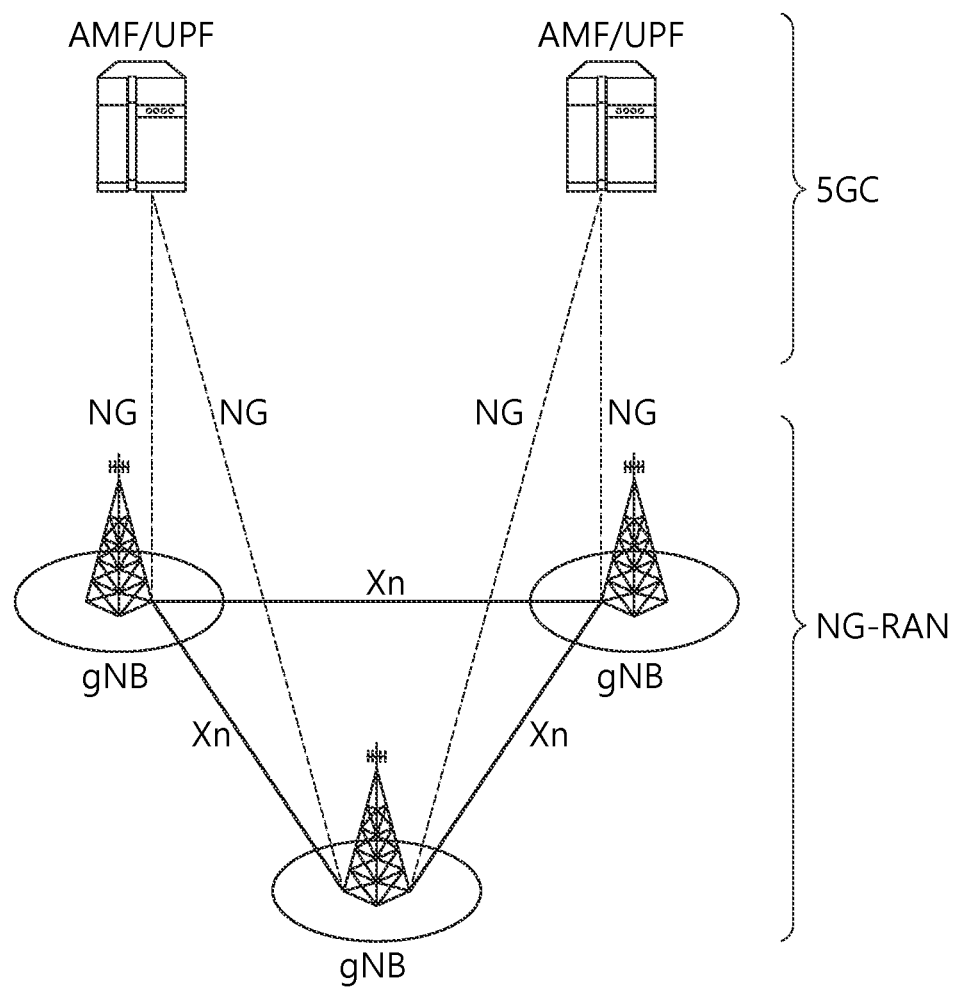
FIG. 4 shows a structure of an NR system, in accordance with an embodiment of the present disclosure.

FIG. 4 shows a structure of an NR system, in accordance with an embodiment of the present disclosure.

Referring to FIG. 4, a Next Generation-Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via $5^{th}$ Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
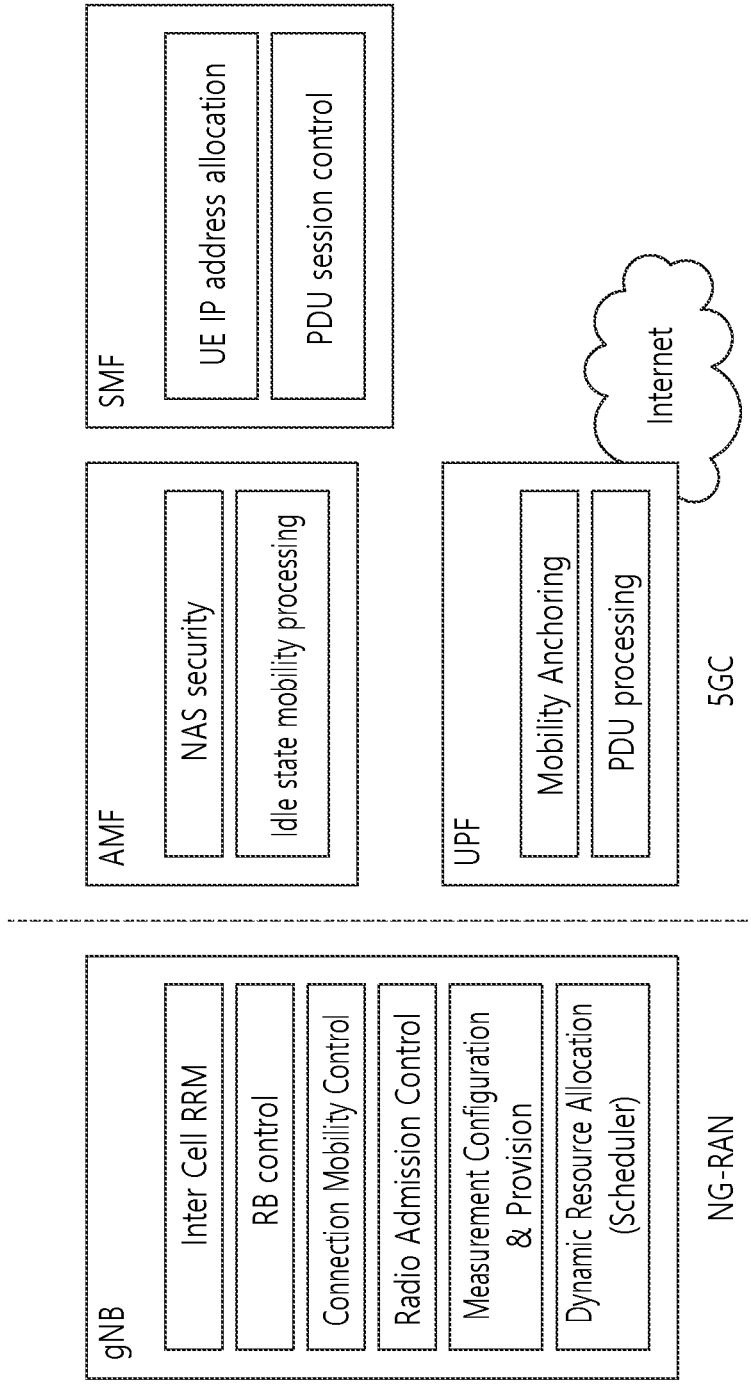
FIG. 5 shows a functional division between an NG-RAN and a 5GC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
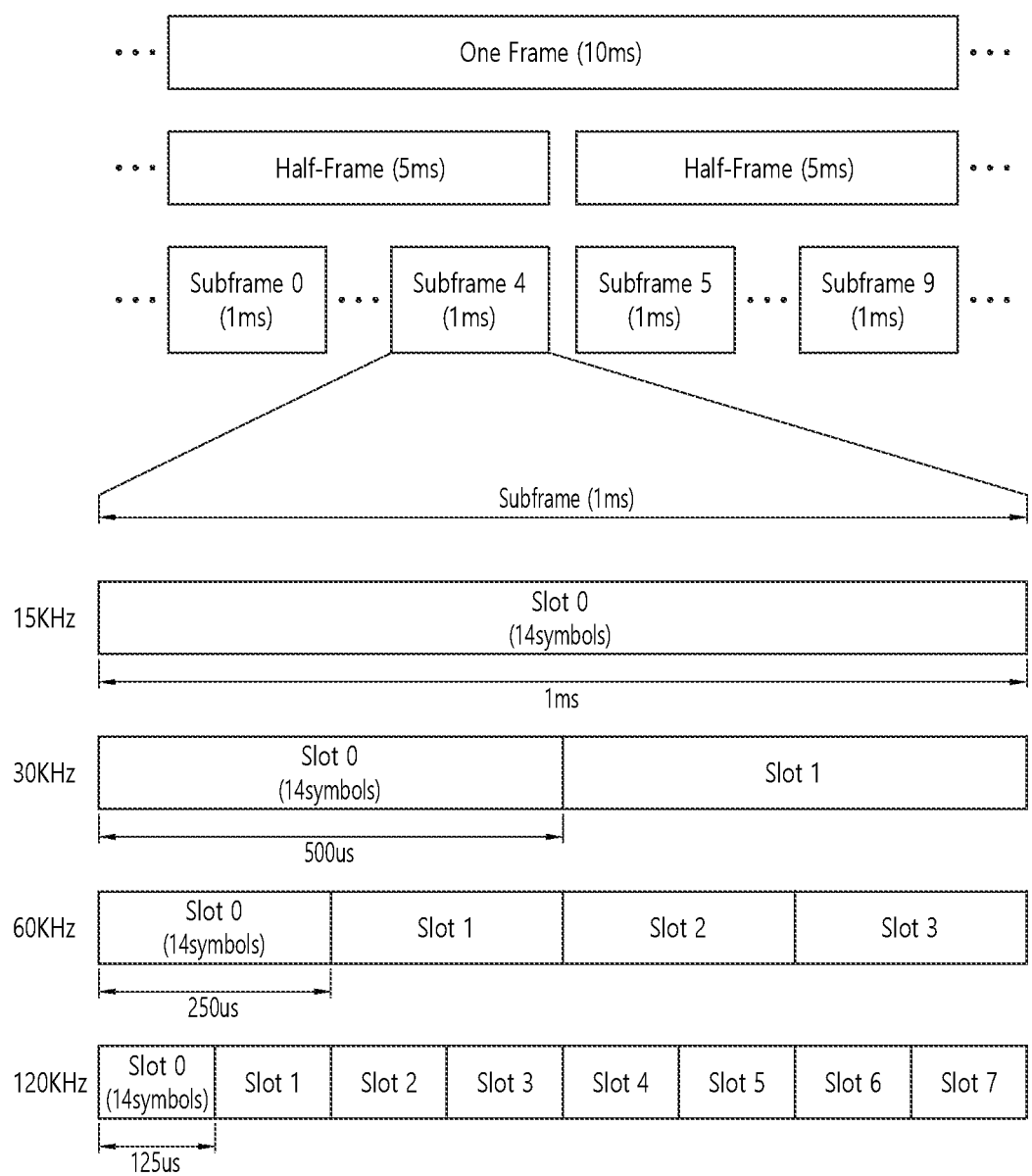
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting various 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 KHz |
| FR2 | 24250 MHz-52600 MHz | 60, 120, 240 KHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 KHz |
| FR2 | 24250 MHz-52600 MHz | 60, 120, 240 KHz |

Figure 7:
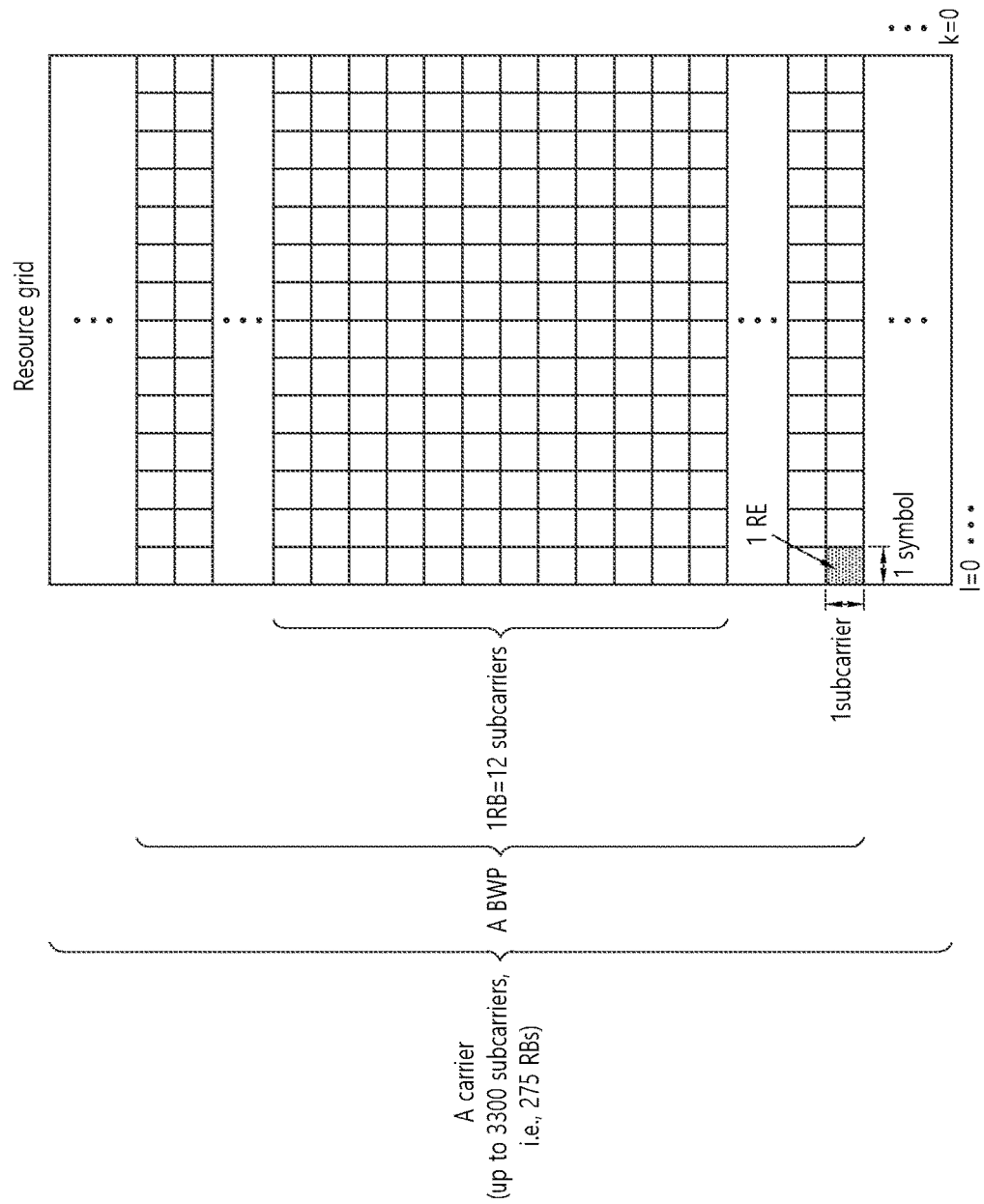
FIG. 7 shows a structure of a slot of an NR frame, in accordance with an embodiment of the present disclosure.

FIG. 7 shows a structure of a slot of an NR frame, in accordance with an embodiment of the present disclosure.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a Bandwidth Part (BWP) and a carrier will be described in detail.

The Bandwidth Part (BWP) may be a continuous set of physical resource blocks (PRBs) within a given numerology. The PRB may be selected from a continuous partial set of a common resource block (CRB) for a given numerology on a given carrier.

When using Bandwidth Adaptation (BA), a receiving bandwidth and a transmitting bandwidth of a user equipment (UE) are not required to be as wide (or large) as the bandwidth of the cell, and the receiving bandwidth and the transmitting bandwidth of the UE may be controlled (or adjusted). For example, the UE may receive information/configuration for bandwidth control (or adjustment) from a network/base station. In this case, the bandwidth control (or adjustment) may be performed based on the received information/configuration. For example, the bandwidth control (or adjustment) may include reduction/expansion of the bandwidth, position change of the bandwidth, or change in subcarrier spacing of the bandwidth.

For example, the bandwidth may be reduced during a duration with little activity in order to save power. For example, a position of the bandwidth may be relocated (or moved) from a frequency domain. For example, the position of the bandwidth may be relocated (or moved) from a frequency domain in order to enhance scheduling flexibility. For example, subcarrier spacing of the bandwidth may be changed. For example, the subcarrier spacing of the bandwidth may be changed in order to authorize different services. A subset of a total cell bandwidth of a cell may be referred to as a Bandwidth Part (BWP). BA may be performed when a base station/network configures BWPs to the UE, and when the base station/network notifies the BWP that is currently in an active state, among the BWPs, to the UE.

For example, the BWP may be one of an active BWP, an initial BWP, and/or a default BWP. For example, the UE may not monitor a downlink radio link quality in a DL BWP other than the active DL BWP within a primary cell (PCell). For example, the UE may not receive a PDCCH, a PDSCH or a CSI-RS (excluding only the RRM) from outside of the active DL BWP. For example, the UE may not trigger a Channel State Information (CSI) report for an inactive DL BWP. For example, the UE may not transmit a PUCCH or a PUSCH from outside of an inactive DL BWP. For example, in case of a downlink, an initial BWP may be given as a continuous RB set for an RMSI CORESET (that is configured by a PBCH). For example, in case of an uplink, an initial BWP may be given by a SIB for a random access procedure. For example, a default BWP may be configured by a higher layer. For example, an initial value of a default BWP may be an initial DL BWP. For energy saving, if the UE fails to detect DCI during a predetermined period of time, the UE may switch the active BWP of the UE to a default BWP.

Meanwhile, a BWP may be defined for the SL. The same SL BWP may be used for transmission and reception. For example, a transmitting UE may transmit an SL channel or SL signal within a specific BWP, and a receiving UE may receive an SL channel or SL signal within the same specific BWP. In a licensed carrier, the SL BWP may be defined separately from a Uu BWP, and the SL BWP may have a separate configuration signaling from the Uu BWP. For example, the UE may receive a configuration for an SL BWP from the base station/network. The SL BWP may be configured (in advance) for an out-of-coverage NR V2X UE and an RRC_IDLE UE. For a UE operating in the RRC_CONNECTED mode, at least one SL BWP may be activated within a carrier.

Figure 8:
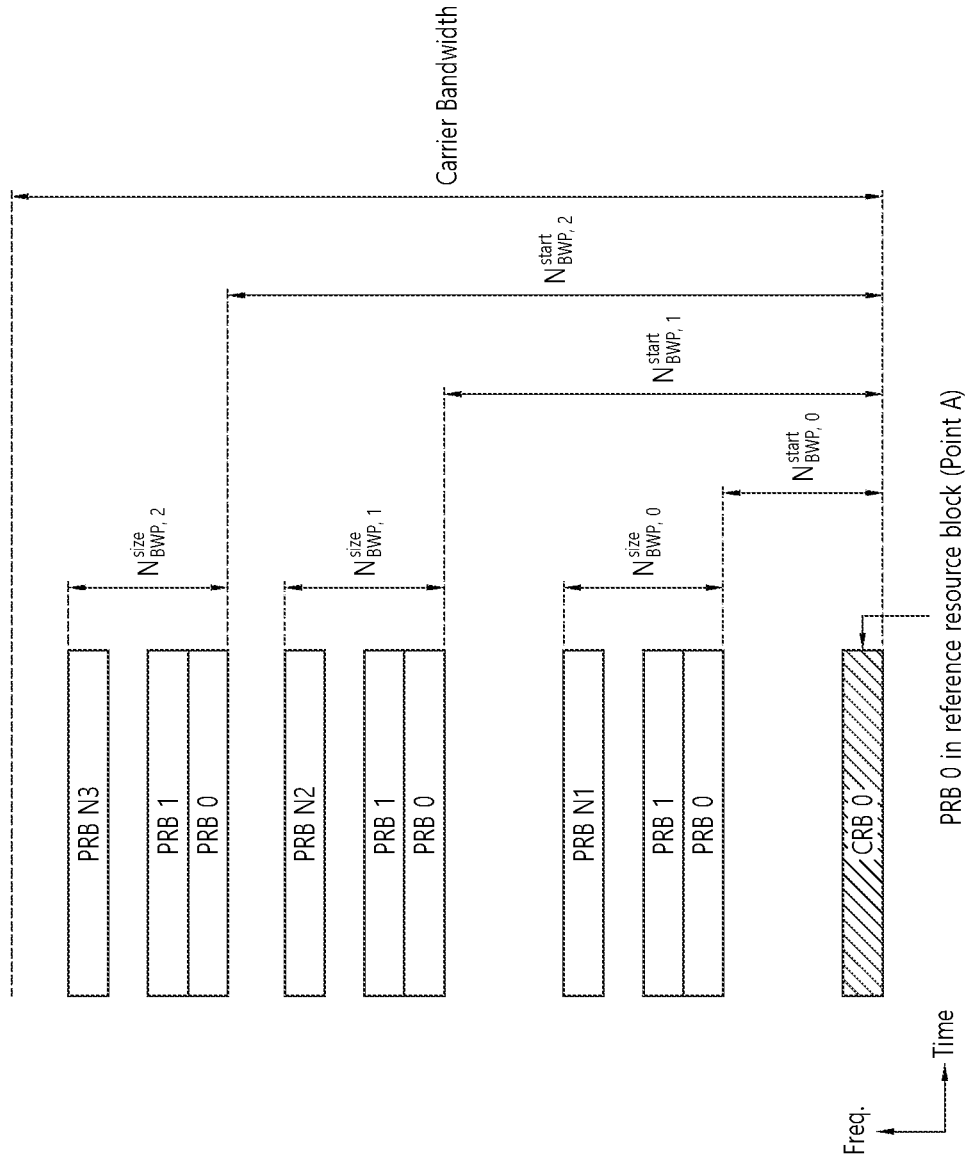
FIG. 8 shows an example of a BWP, in accordance with an embodiment of the present disclosure.

FIG. 8 shows an example of a BWP, in accordance with an embodiment of the present disclosure. In the embodiment of FIG. 8, it is assumed that three BWPs exist.

Referring to FIG. 8, a common resource block (CRB) may be a carrier resource block that is numerated from one end of a carrier band to another end. And, a PRB may be a resource block that is numerated within each BWP. Point A may indicate a common reference point for a resource block grid.

A BWP may be configured by Point A, an offset ($N^{start}_{BWP}$) from Point A, and a bandwidth ($N^{size}_{BWP}$). For example, Point A may be an external reference point of a PRB of a carrier having subcarrier 0 of all numerologies (e.g., all numerologies being supported by the network within the corresponding carrier) aligned therein. For example, the offset may be a PRB distance between a lowest subcarrier within a given numerology and Point A. For example, the bandwidth may be a number of PRBs within the given numerology.

Hereinafter, V2X or SL communication will be described.

Figure 9:
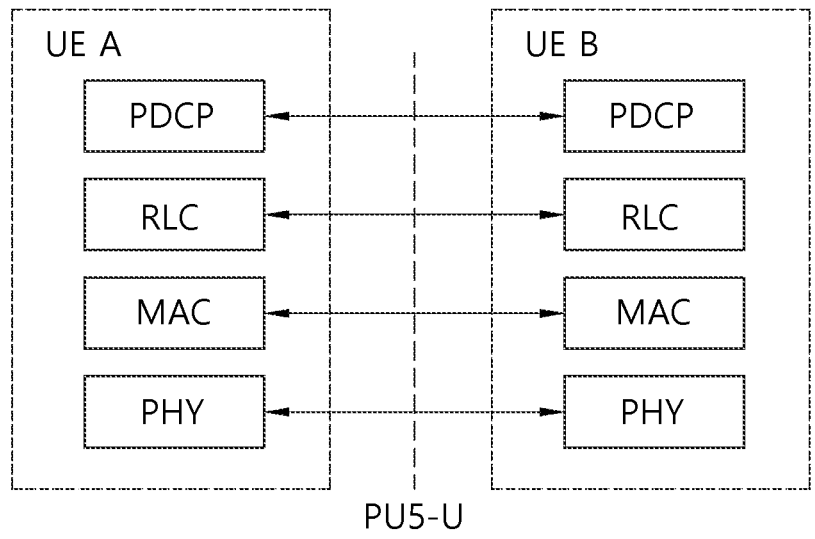
FIG. 9 shows a protocol stack for a SL communication, in accordance with an embodiment of the present disclosure.
Figure 9:
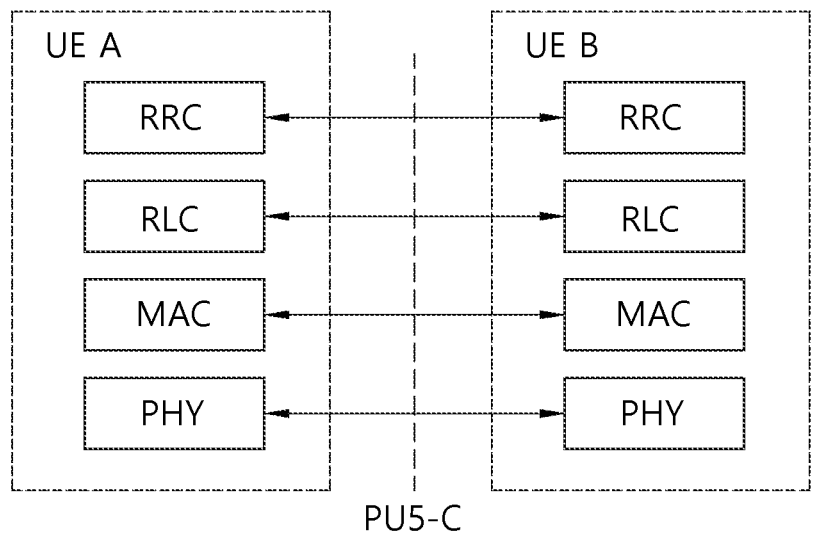

FIG. 9 shows a protocol stack for a SL communication, in accordance with an embodiment of the present disclosure. More specifically, (a) of FIG. 9 shows a user plane protocol stack of LTE, and (b) of FIG. 9 shows a control plane protocol stack of LTE.

Figure 10:
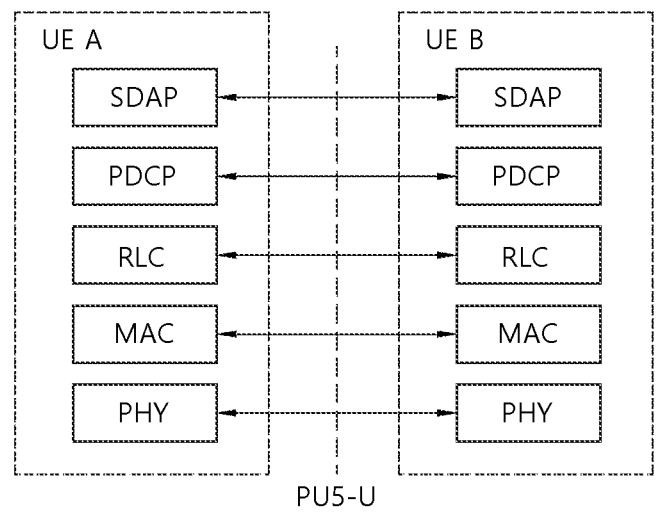
FIG. 10 shows a protocol stack for a SL communication, in accordance with an embodiment of the present disclosure.
Figure 10:
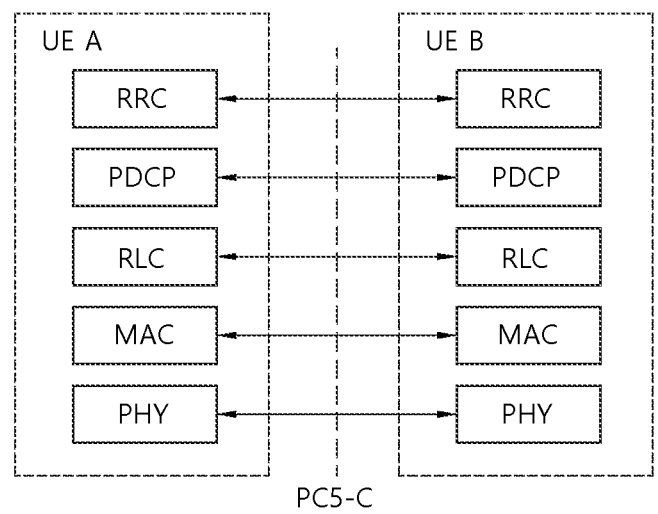

FIG. 10 shows a protocol stack for a SL communication, in accordance with an embodiment of the present disclosure. More specifically, (a) of FIG. 10 shows a user plane protocol stack of NR, and (b) of FIG. 10 shows a control plane protocol stack of NR.

Hereinafter, SL Synchronization Signal (SLSS) and synchronization information will be described.

SLSS is a SL specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving SL signals. For example, the basic information may be information related to SLSS, a Duplex mode (DM), Time Division Duplex Uplink/Downlink (TDD UL/DL) configuration, information related to a resource pool, application types related to SLSS, a subframe offset, broadcast information, and so on.

The S-PSS, the S-SSS, and the PSBCH may be included in a block format (e.g., a SL SS/PSBCH block, hereinafter referred to as Sidelink-Synchronization Signal Block (S-SSB)). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL Bandwidth Part (BWP). And, a frequency position of the S-SSB may be (pre-)configured. Therefore, the UE is not required to perform a hypothesis detection in order to discover the S-SSB in the carrier.

Each SLSS may have a physical layer SL synchronization identity (ID), and the respective value may be equal to any one value ranging from 0 to 335. Depending upon one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer SL synchronization ID values, values 0 to 167 may be values being used by a network, and values from 168 to 335 may be values being used outside of the network coverage.

Figure 11:
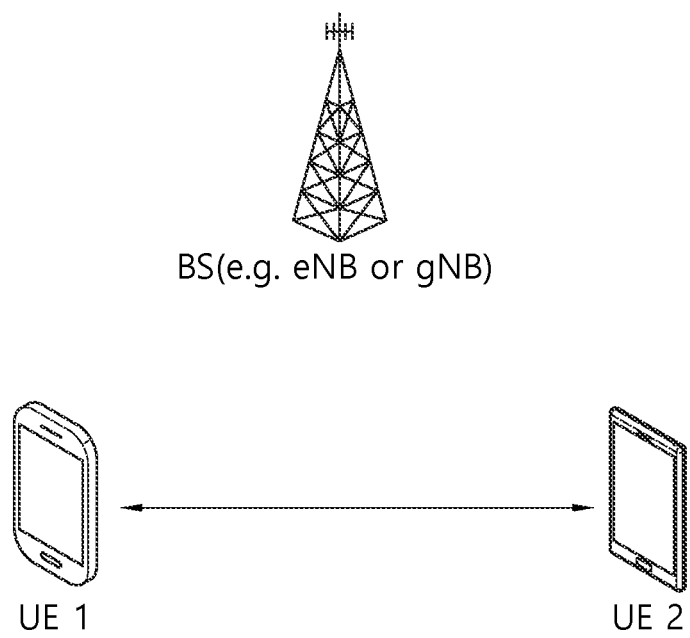
FIG. 11 shows a UE performing V2X or SL communication, in accordance with an embodiment of the present disclosure.

FIG. 11 shows a UE performing V2X or SL communication, in accordance with an embodiment of the present disclosure.

Referring to FIG. 11, in V2X/SL communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a SL signal by using the corresponding resource unit. User equipment 2 (UE2), which is to a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside a connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its SL signal transmission.

Figure 12:
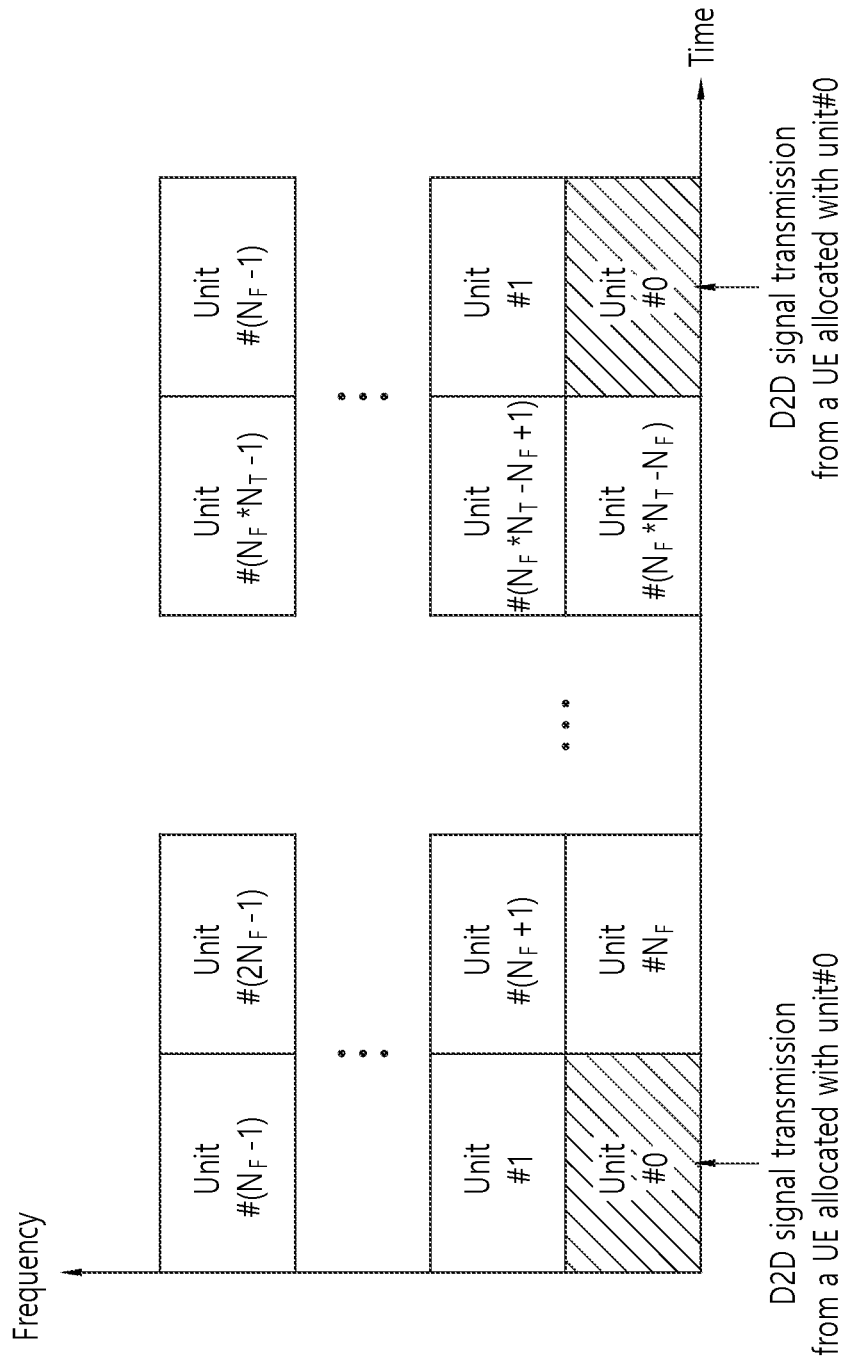
FIG. 12 shows a resource unit for V2X or SL communication, in accordance with an embodiment of the present disclosure.

FIG. 12 shows a resource unit for V2X or SL communication, in accordance with an embodiment of the present disclosure.

Referring to FIG. 12, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 12 shows an example of a case where the corresponding resource pool is repeated at a cycle of $N_T$ number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit SL signals.

The resource pool may be segmented to multiple types. For example, depending upon the content of a SL signal being transmitted from each resource pool, the resource pool may be divided as described below.

(1) Scheduling Assignment (SA) may be a signal including information, such as a position of a resource that is used for the transmission of a SL data channel, a Modulation and Coding Scheme (MCS) or Multiple Input Multiple Output (MIMO) transmission scheme needed for the modulation of other data channels, a Timing Advance (TA), and so on. The SA may also be multiplexed with SL data within the same resource unit and may then be transmitted, and, in this case, an SA resource pool may refer to a resource pool in which the SA is multiplexed with the SL data and then transmitted. The SA may also be referred to as a SL control channel.

(2) A Physical Sidelink Shared Channel (PSSCH) may be a resource pool that is used by a transmitting UE for transmitting user data. If the SA is multiplexed with SL data within the same resource unit and then transmitted, only a SL data channel excluding the SA information may be transmitted from the resource pool that is configured for the SL data channel. In other words, REs that were used for transmitting SA information within a separate resource unit of the SA resource pool may still be used for transmitting SL data from the resource pool of a SL data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described SL signal is the same, different resource pools may be used depending upon the transmission/reception attribute of the SL signal. For example, even if the same SL data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each SL signal within a subframe or a number of subframes being used for the transmission of one SL signal) of the SL signal, signal intensity from the base station, a transmitting power intensity (or level) of a SL UE, and so on.

Hereinafter, resource allocation in a SL will be described.

Figure 13:
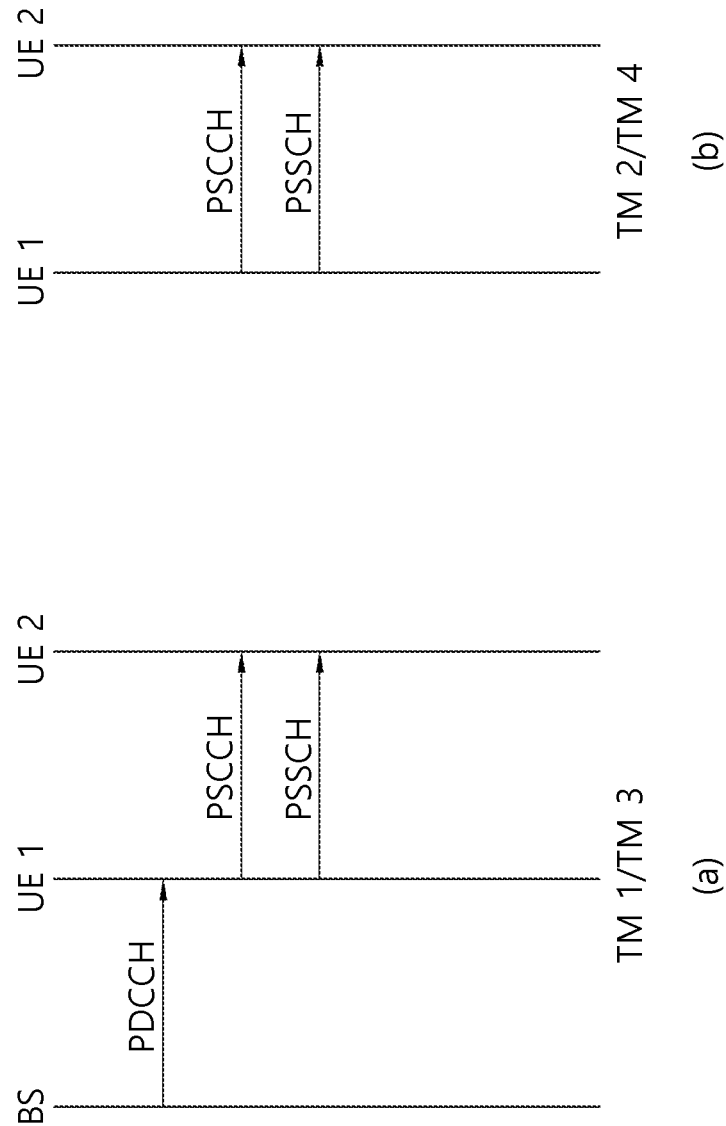
FIG. 13 shows procedures of a UE performing V2X or SL communication according to a transmission mode (TM), in accordance with an embodiment of the present disclosure.

FIG. 13 shows procedures of a UE performing V2X or SL communication according to a transmission mode (TM), in accordance with an embodiment of the present disclosure. Specifically, (a) of FIG. 13 shows a UE operation related to a transmission mode 1 or a transmission mode 3, and (b) of FIG. 13 shows a UE operation related to a transmission mode 2 or a transmission mode 4.

Referring to (a) of FIG. 13, in transmission modes 1/3, the base station performs resource scheduling to UE1 via PDCCH (more specifically, Downlink Control Information (DCI)), and UE1 performs SL/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE SL, transmission mode 1 may be applied to a general SL communication, and transmission mode 3 may be applied to a V2X SL communication.

Referring to (b) of FIG. 13, in transmission modes 2/4, the UE may schedule resources on its own. More specifically, in case of LTE SL, transmission mode 2 may be applied to a general SL communication, and the UE may select a resource from a predetermined resource pool on its own and may then perform SL operations. Transmission mode 4 may be applied to a V2X SL communication, and the UE may carry out a sensing/SA decoding procedure, and so on, and select a resource within a selection window on its own and may then perform V2X SL operations. After transmitting the SCI to UE2 via PSCCH, UE1 may transmit SCI-based data via PSSCH. Hereinafter, the transmission mode may be abbreviated to the term mode.

In case of NR SL, at least two types of SL resource allocation modes may be defined. In case of mode 1, the base station may schedule SL resources that are to be used for SL transmission. In case of mode 2, the user equipment (UE) may determine a SL transmission resource from SL resources that are configured by the base station/network or predetermined SL resources. The configured SL resources or the pre-determined SL resources may be a resource pool. For example, in case of mode 2, the UE may autonomously select a SL resource for transmission. For example, in case of mode 2, the UE may assist (or help) SL resource selection of another UE. For example, in case of mode 2, the UE may be configured with an NR configured grant for SL transmission. For example, in case of mode 2, the UE may schedule SL transmission of another UE. And, mode 2 may at least support reservation of SL resources for blind retransmission.

Procedures related to sensing and resource (re-)selection may be supported in resource allocation mode 2. The sensing procedure may be defined as a process decoding the SCI from another UE and/or SL measurement. The decoding of the SCI in the sensing procedure may at least provide information on a SL resource that is being indicated by a UE transmitting the SCI. When the corresponding SCI is decoded, the sensing procedure may use L1 SL Reference Signal Received Power (RSRP) measurement, which is based on SL Demodulation Reference Signal (DMRS). The resource (re-)selection procedure may use a result of the sensing procedure in order to determine the resource for the SL transmission.

Figure 14:
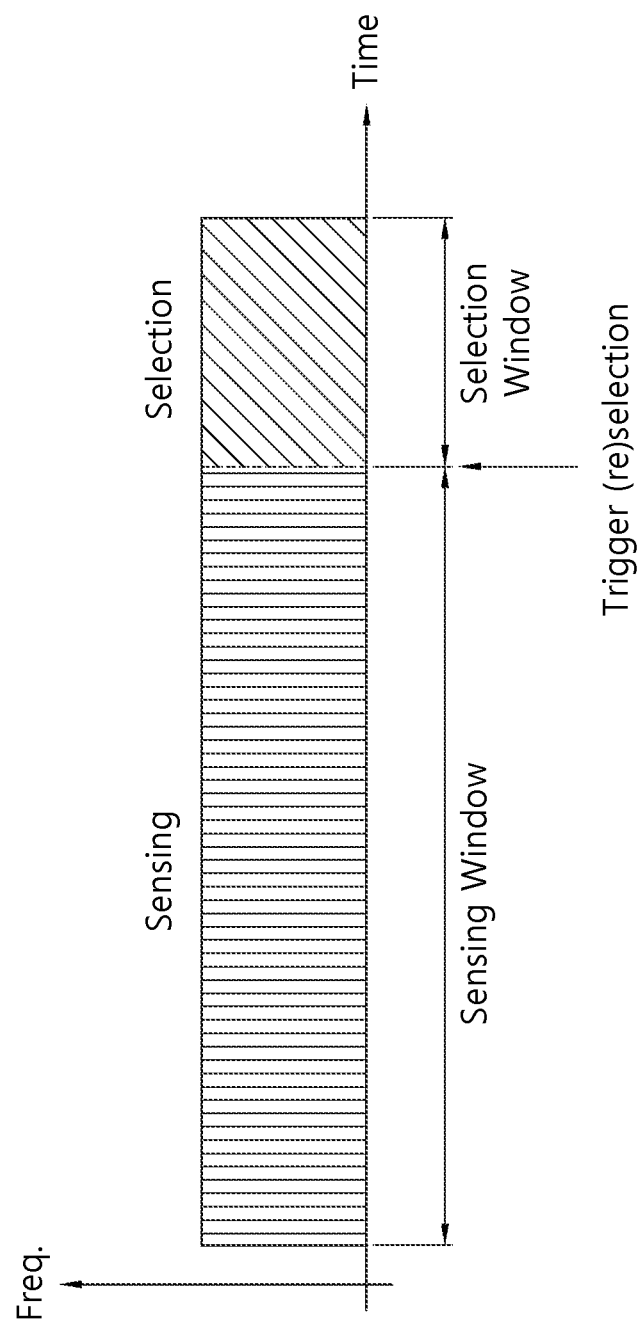
FIG. 14 shows a method of selecting a transmission resource by a UE, in accordance with an embodiment of the present disclosure.

FIG. 14 shows a method of selecting a transmission resource by a UE, in accordance with an embodiment of the present disclosure.

Referring to FIG. 14, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceeds a threshold value from the selection window. Thereafter, the UE may randomly select a SL resource from the remaining resources within the selection window.

Alternatively, the UE may measure a Received Signal Strength Indicator (RSSI) of the periodic resources within the sensing window and may then determine the resources having low interference (e.g., the lower 20% of the resources). Additionally, the UE may also randomly select a SL resource from the resources included in the selection window among the periodic resources. For example, in case the UE fails to perform decoding of the PSCCH, the UE may use the above described methods.

Figure 15:
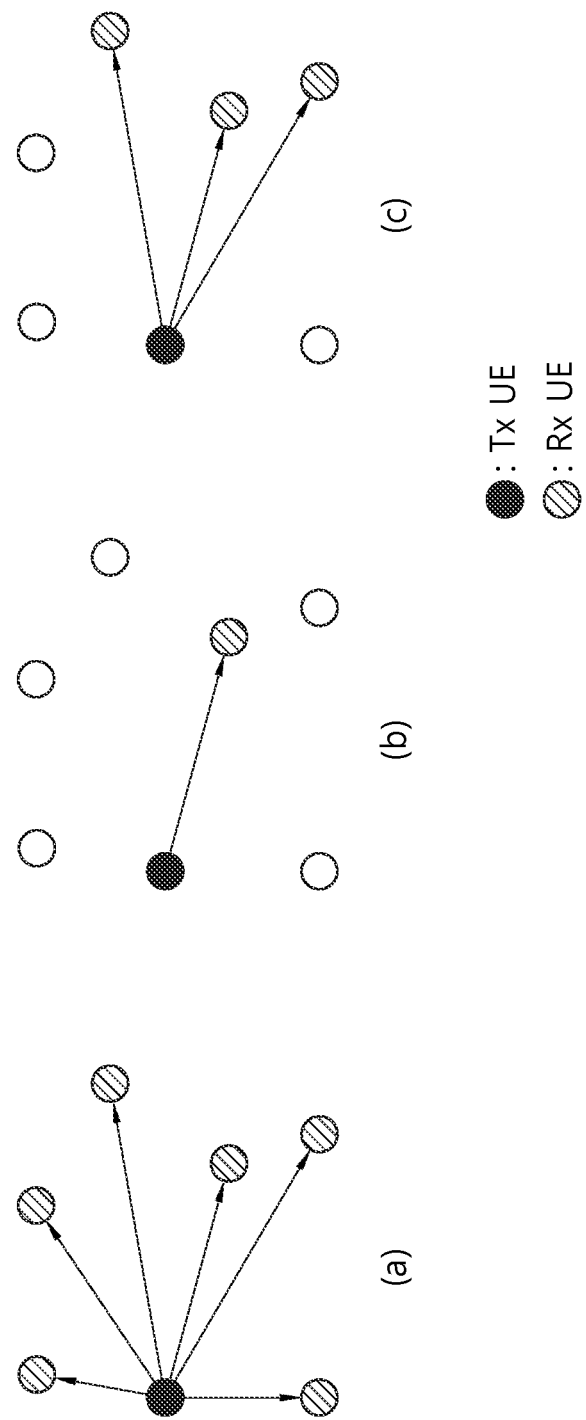
FIG. 15 shows three different cast types, in accordance with an embodiment of the present disclosure.

FIG. 15 shows three different cast types, in accordance with an embodiment of the present disclosure.

More specifically, (a) of FIG. 15 shows a broadcast type SL communication, (b) of FIG. 15 shows a unicast type SL communication, and (c) of FIG. 15 shows a groupcast type SL communication. In case of the broadcast type SL communication, the UE may perform one-to-one communication with another UE. And, in case of the unicast type SL communication, the UE may perform SL communication with one or more other UEs within the group to which the corresponding UE belongs. In the various embodiments of the present disclosure, the SL groupcast communication may be replaced with SL multicast communication, SL one-to-many communication, and so on.

Hereinafter, a Hybrid Automatic Repeat Request (HARQ) procedure in an SL will be described in detail.

In case of SL unicast and SL groupcast, HARQ feedback and HARQ combining in a physical layer may be supported. For example, in case a receiving UE operates in a Resource Allocation Mode 1 or 2, the receiving UE may receive a PSSCH from a transmitting UE, and the receiving UE may transmit an HARQ feedback corresponding to the PSSCH to the transmitting UE by using a Sidelink Feedback Control Information (SFCI) format via Physical Sidelink Feedback Channel (PSFCH).

For example, an SL HARQ feedback may be enabled for the unicast. In this case, in a non-Code Block Group (non-CBG), the receiving UE may decode a PSCCH targeting the receiving UE, and, when the receiving UE successfully decodes a transport block related to the PSCCH, the receiving UE may generate an HARQ-ACK. Thereafter, the receiving UE may transmit the HARQ-ACK to the transmitting UE. Conversely, after the receiving UE decodes the PSCCH targeting the receiving UE, if the receiving UE fails to successfully decode a transport block related to the PSCCH, the receiving UE may generate an HARQ-NACK, and the receiving UE may transmit the HARQ-NACK to the transmitting UE.

For example, an SL HARQ feedback may be enabled for the groupcast. For example, during the non-CBG, two different types of HARQ feedback options may be supported for the groupcast.

(1) Groupcast option 1: After decoding a PSCCH targeting the receiving UE, if the receiving UE fails to decode a transport block related to the PSCCH, the receiving UE may transmit an HARQ-NACK to a transmitting UE via a PSFCH. Conversely, when a receiving UE decodes a PSCCH targeting the receiving UE, and when the receiving UE successfully decodes a transport block related to the PSCCH, the receiving UE may not transmit an HARQ-ACK to a transmitting UE.

(2) Groupcast option 2: After decoding a PSCCH targeting the receiving UE, if the receiving UE fails to decode a transport block related to the PSCCH, the receiving UE may transmit an HARQ-NACK to a transmitting UE via a PSFCH. And, when the receiving UE decodes a PSCCH targeting the receiving UE, and when the receiving UE successfully decodes a transport block related to the PSCCH, the receiving UE may transmit an HARQ-ACK to a transmitting UE via the PSFCH.

As described above, in order to satisfy a V2X scenario (e.g., eV2X scenario) requiring higher reliability in NR V2X, HARQ feedback may be supported in unicast and groupcast communication. For example, in case of groupcast communication, a transmitting UE may establish link association with multiple receiving UEs. For simplicity in the description, when a transmitting UE (TX UE) establishes a link with multiple receiving UEs (RX UEs) and performs SL communication, this may be referred to as a connection-oriented groupcast. Conversely, although a transmitting UE may not establish link association with multiple receiving UEs, the transmitting UE may perform SL communication with the multiple receiving UEs by using a broadcast method. In this case, for group management, a receiving UE may determine whether or not to perform HARQ feedback based on a communication distance or absolute distance, and so on, for all broadcast transmissions. For simplicity in the description, as described above, when a transmitting UE performs sidelink communication with one or more UEs within a group without any RRC connection on a PC5 interface, this may be referred to as a connection-less groupcast.

For example, in a connection-less groupcast, a transmitting UE may transmit information on its communication distance or information on a target distance of a service being transmitted by the transmitting UE to multiple receiving UEs. Additionally, the transmitting UE may transmit information on its location to multiple receiving UEs. In this case, the multiple receiving UEs may determine their distances with the transmitting UE based on the received information, and the multiple receiving UEs may determine whether or not to perform HARQ feedback to the transmitting UE. A receiving UE may not transmit unnecessary HARQ feedback by performing the distance-based HARQ feedback operation, and, accordingly, resource availability may be enhanced. Additionally, decoding efficiency resulting from re-transmission of the transmitting UE may be enhanced.

Hereinafter, according to various embodiments of the present disclosure, a method for transmitting, by a UE, information association with a location of the UE in NR V2X communication and a device for supporting the same will be described in detail.

Figure 16:
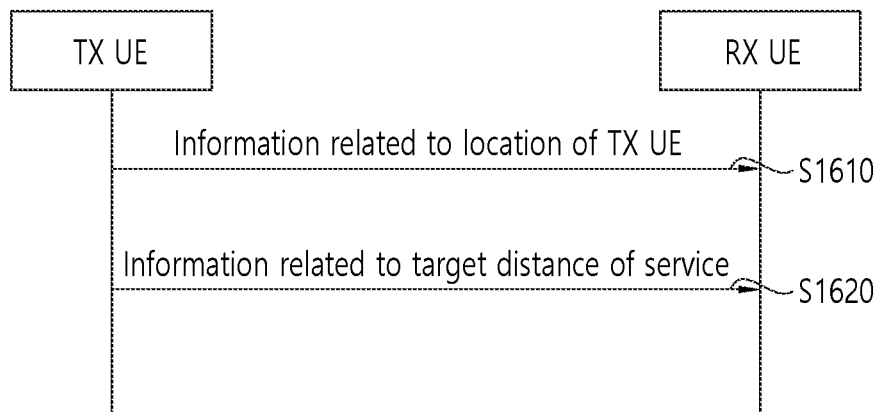
FIG. 16 shows a procedure for transmitting, by a transmitting UE, information associated to its location, in accordance with an embodiment of the present disclosure.

FIG. 16 shows a procedure for transmitting, by a transmitting UE, information associated to its location, in accordance with an embodiment of the present disclosure. The embodiment of FIG. 16 may be combined with various embodiments of the present disclosure. In the embodiment of FIG. 16, the order of each process step may be changed.

Referring to FIG. 16, in step S1610, a transmitting UE may transmit information related to a location of the transmitting UE to another UE (e.g., receiving UE).

For example, information related to the location of the transmitting UE may be transmitted to another UE through part of a channel being pre-defined in advance for the transmitting UE. For example, the information related to the location of the transmitting UE may be included in a Sidelink Control Information (SCI) being transmitted by the transmitting UE and may, then, be transmitted to another UE.

For example, the information related to the location of the transmitting UE may be included in part of a V2X-related message and may, then, be transmitted to another UE. For example, the information related to the location of the transmitting UE may be piggy-backed to part of a V2X-related message and may, then, be transmitted to another UE. For example, the information related to the location of the transmitting UE may be piggy-backed to a data region and may, then, be transmitted to another UE. For example, the information related to the location of the transmitting UE may be transmitted to another UE through a PSSCH.

For example, information related to the location of the transmitting UE being transmitted on a SCI and information related to the located of the transmitting UE being piggy-backed to a data region and then transmitted may be information having a hierarchical relation. For example, in order to reduce a size of transported (or transferred) information, the information related to the location of the transmitting UE being transmitted on a SCI by the transmitting UE may be information being divided (or split) to a high granularity. For example, the information related to the located of the transmitting UE being piggy-backed to a data region and then transmitted by the transmitting UE may be information having finer granularity.

In step S1620, the transmitting UE may transmit a target distance to another UE (e.g., receiving UE) according to a service being transmitted by the transmitting UE. For example, the transmitting UE may transmit a target distance related to a service being transmitted by the transmitting UE to another UE. For example, the transmitting UE may transmit a target distance being mapped to a service being transmitted by the transmitting UE to another UE.

For example, the target distance related to a service being transmitted by the transmitting UE may be transmitted through a channel being pre-defined in advance for the transmitting UE. For example, the target distance related to a service being transmitted by the transmitting UE may be included in a Sidelink Control Information (SCI) being transmitted by the transmitting UE and may, then, be transmitted to another UE.

For example, the target distance related to a service being transmitted by the transmitting UE may be included in part of a V2X-related message and may, then, be transmitted to another UE. For example, the target distance related to a service being transmitted by the transmitting UE may be piggy-backed to part of a V2X-related message and may, then, be transmitted to another UE. For example, the target distance related to a service being transmitted by the transmitting UE may be piggy-backed to a data region and may, then, be transmitted to another UE. For example, the target distance related to a service being transmitted by the transmitting UE may be transmitted to another UE through a PSSCH.

Hereinafter, according to various embodiments of the present disclosure, a method of how to configure and transmit, by a UE, which location-associated information will be described in detail. For simplicity in the description, although the method will be divided to Proposed Method #1 to Proposed Method #4, at least one of Proposed Method #1 to Proposed Method #4 may be inter-combined.

1. Proposed Method #1

According to an embodiment of the present disclosure, a transmitting UE may transmit its geographical location information to another UE (e.g., receiving UE). For example, the geographical location information may include at least one of longitude, latitude, and/or altitude. For example, by using at least one of longitude, latitude, and/or altitude being defined in Cooperative Awareness Messages (CAM) of an ITS standard, the transmitting UE may acquire or determine its geographical location information. For example, by using information acquired from a Global Positioning System (GPS), the transmitting UE may acquire or determine its geographical location information.

For example, it will be assumed that, in order to acquire or determine its geographical location information, the transmitting UE uses a CAM message. In this case, geographical location information included in the CAM message may be a coordinates system referred to as WGS84 (longitude-latitude). For example, according to the WGS84 coordinates system, locations of X (latitude), Y (longitude), Z (altitude) may be expressed in degrees, minutes, and seconds. In a CAM, the WGS84 coordinates system may be converted to integers so that the location can be expressed to up to 0.1 micro degree (e.g., approximately 1 cm), and this means that each of X, Y, Z configures a data size of approximately 10 bits.

In case the transmitting UE expresses all of the absolute locations X, Y, Z by using the location information within the CAM message, and in case the transmitting UE transmits all of the absolute locations to another UE, the size of a data payload being transmitted by the transmitting UE from a physical layer may be excessively increased.

Therefore, according to the embodiment of the present disclosure, the transmitting UE may reduce the information on X, Y, Z and transmit the reduced information to another UE. For example, the transmitting UE may not transmit all of the information related to the absolute location to another UE. For example, the transmitting UE may only transmit part of the information, among all of the information related to the absolute location. For example, in order to deliver (or transfer) only part of the region, among all of the information related to the absolute location, the transmitting UE may signal the information corresponding to part of the region by performing masking. The reason why this method can be used is because the integer-converted information is location information having absolute coordinates, wherein part of the region has a high-granularity distance.

For example, it will be assumed that a location of the transmitting UE according to the longitude-latitude coordinates system is 36 degrees 10 minutes 10 seconds. In the longitude-latitude coordinates system, a difference of 1 degree between 36 degrees and 37 degrees may mean a distance difference of approximately 111 km. Meanwhile, since the communication distance of a V2X message cannot be equal to approximately 111 km, the transmitting UE may exclude the information corresponding to 36 degrees from the information related to its location, and may transmit the processed information to another UE (e.g., receiving UE). In this case, the receiving UE may assume that its location, which is known from the GPS information, is in the same 36 degrees as the transmitting UE. More specifically, for example, even if the transmitting UE excludes the information corresponding to 36 degrees from the information related to its location and transmits the corresponding information to the receiving UE, the receiving UE existing at a location corresponding to 36 degrees may determine that the transmitting UE also exists at a location corresponding to 36 degrees.

Additionally/Alternatively, for example, since a location information being expressed in a CAM may be expressed to up to a minimum of 1 cm in units of 0.1 micro degree, the receiving UE may restrict information indicating low granularity, among the information related to its location. For example, the transmitting UE may exclude information corresponding to 10 seconds from the information related to its location and may then transmit the processed information to another UE (e.g., receiving UE).

For example, in case the transmitting UE restricts the information by adequately masking the information related to its location, data size of the information related to the location of the transmitting UE being transmitted by the transmitting UE may be reduced. For example, in order to allow the receiving UE to differentiate a theoretical communication distance, the transmitting UE may mask or restrict the information related to the location of the transmitting UE. For example, in order to allow the receiving UE to differentiate a specific multiple of the communication distance, the transmitting UE may mask or restrict the information related to the location of the transmitting UE.

For example, regulations on how the transmitting UE is to perform masking on the information related to its location may be pre-determined in advance by a higher layer, and such regulations may be transmitted to the transmitting UE from the higher layer. For example, regulations on how the transmitting UE is to perform masking on the information related to its location may be pre-determined in advance by a higher layer, and such regulations may be periodically transmitted or updated, in long term, to the transmitting UE from the higher layer. For example, the transmitting UE may determine how to perform masking on the information related to the transmitting UE.

For example, regulations on which information shall be excluded from the information related to its location and transmitting the processed information to the receiving UE may be pre-determined in advance by a higher layer, and such regulations may be transmitted to the transmitting UE from the higher layer. For example, regulations on which information shall be excluded from the information related to its location and transmitting the processed information to the receiving UE may be pre-determined in advance by a higher layer, and such regulations may be periodically transmitted or updated, in long term, to the transmitting UE from the higher layer. For example, the transmitting UE may determine which information shall be excluded from the information related to its location and, then, to transmit the processed information to the receiving UE.

For example, as described above, the transmitting UE may not need to accurately deliver its absolute location to another UE. In other words, the transmitting UE may reduce the information related to its location and may transmit the reduced information to another UE, so that a target distance of a service being transmitted by the transmitting UE or an extent of a wireless communication distance can be expressed. For example, it will be assumed that the transmitting UE is currently located on an X coordinate, and that the location of the X coordinate is expressed in the form of an integer, such as "123456". In this case, each index may indicate an extent (or approximation) in meters of an actual distance. For example, information on "12" may express an extent in units of several hundreds of kilometers (km). In this case, the transmitting UE may restrict the corresponding information from the location information that is to be transmitted. Similarly, "56" may express several meter units, and, in this case, the transmitting UE may not need to transmit such fine distance information, as described above. More specifically, for example, among the information related to its location, the transmitting UE may roughly transmit part of the information. For example, in "123456", the transmitting UE may transmit only the information on "34" to another UE. After receiving the information on "34", the receiving UE may know high-granularity location information through its GPS information, and the receiving UE may calculate its distance from the transmitting UE by using its location information and the information on "34". Thereafter, the receiving UE may compare a target distance related to a service that is received from the transmitting UE with the calculated distance between the transmitting UE and the receiving UE and may, then, determine whether or not to perform HARQ feedback for the service.

Figure 17:
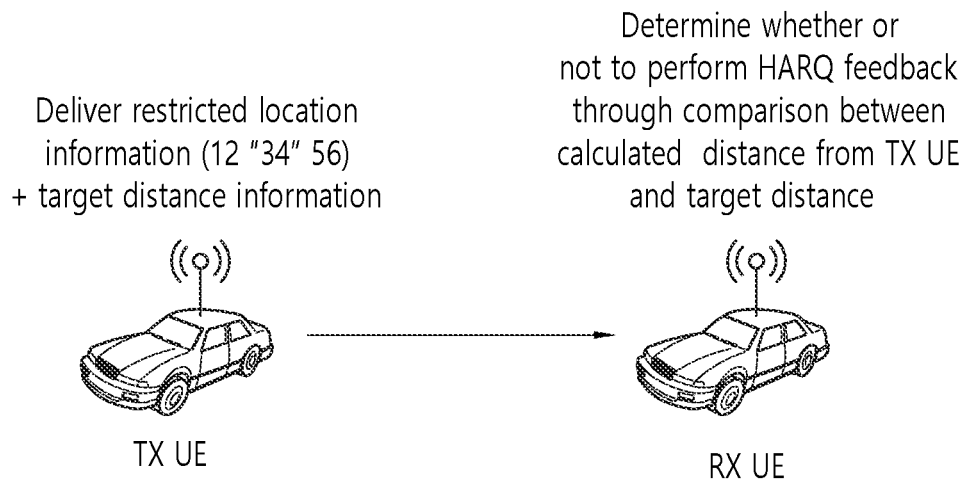
FIG. 17 shows a method for determining, by a receiving UE, whether or not to perform HARQ feedback based on its distance from a transmitting UE, in accordance with an embodiment of the present disclosure.

FIG. 17 shows a method for determining, by a receiving UE, whether or not to perform HARQ feedback based on its distance from a transmitting UE, in accordance with an embodiment of the present disclosure.

Referring to FIG. 17, among the information related to its location, a transmitting UE may restrict part of the information and transmit the restricted location information to a receiving UE, and, then, the transmitting UE may transmit a target distance related to a service to the receiving UE. Based on location information of the receiving UE and the restricted location information of the transmitting UE, the receiving UE may calculate a distance between the receiving UE and the transmitting UE. If the distance between the receiving UE and the transmitting UE is shorter than the target distance related to a service, the receiving UE may transmit HARQ feedback on the service to the transmitting UE. If the distance between the receiving UE and the transmitting UE is longer than the target distance related to a service, the receiving UE may not transmit HARQ feedback on the service to the transmitting UE.

For example, due to the restricted location information of the transmitting UE, the receiving UE may not be capable of performing an accurate measurement of its distance from the transmitting UE. Therefore, the receiving UE may manage information by processing the restricted location information of the transmitting UE. For example, the receiving UE may apply ±1 to/from a Most Significant Bit (MSB) among the restricted location information of the transmitting UE, which is received from the transmitted UE. Subsequently, the receiving UE may determine all candidate groups applying ±1 to/from the MSB as the location information of the transmitting UE. Thereafter, the receiving UE may calculate a distance between the receiving UE and the transmitting UE for all candidate groups, and, then, among all candidate groups, the receiving UE may determine that the transmitting UE exists in a distance having the smallest value. At this point, if a masking process cutting the MSB is performed so that the MSB can be cut in communication range units, it may be determined that one transmitting UE exists in one communication range.

TABLE 5

| Restricted location information of a transmitting UE transmitted by the transmitting UE | Information processed by the receiving UE | Distance from the transmitting UE calculated by the receiving UE |
|---|---|---|
| 34 | 24 | A |
|  | 34 | B |
|  | 44 | C |

For example, referring to Table 5, among the information related to its location, the transmitting UE may transmit restricted location information to the receiving UE. For example, the restricted information may be "34". In this case, the receiving UE may apply ±1 to/from the MSB, and, then, the receiving UE may determine that the location of the transmitting UE is one of "24", "34", or "44". The receiving UE may calculate its distance from the transmitting UE by using its location information and the information processed by the receiving UE. For example, the distance between the receiving UE and the transmitting UE, which is calculated by the receiving UE, may be A, B, and C. If A>B>C, the receiving UE may determine that its distance from the transmitting UE is C. Thereafter, the receiving UE may compare a target distance related to a service that is transmitted by the transmitting UE to C and may then determine whether or not to transmit a HARQ feedback to the transmitting UE.

2. Proposed Method #2

In the various embodiments of the present disclosure, a ZONE ID may mean a ZONE index using the geographical information of a UE, which is defined in a V2X system of 3GPP Release 14. For example, in NR V2X, a split granularity of a ZONE may be differently configured in accordance with a service type or service requirements (e.g., priority level information, reliability, latency) and/or speed of a UE, and so on. For example, split granularity of a ZONE may be signaled in advance to the UE from a higher layer.

Meanwhile, the transmitting UE may deliver its location to another UE based on a ZONE ID to which the transmitting UE belongs. However, in case the transmitting UE delivers a ZONE ID, which is defined in a V2X system of a legacy 3GPP Release 14, to another UE, the following problems may occur. For example, the transmitting UE may deliver a ZONE ID of a region to which it belongs to another UE, and, accordingly, if the receiving UE performs HARQ feedback based on the ZONE ID, problems may occur, as shown in FIG. 18.

Figure 18:
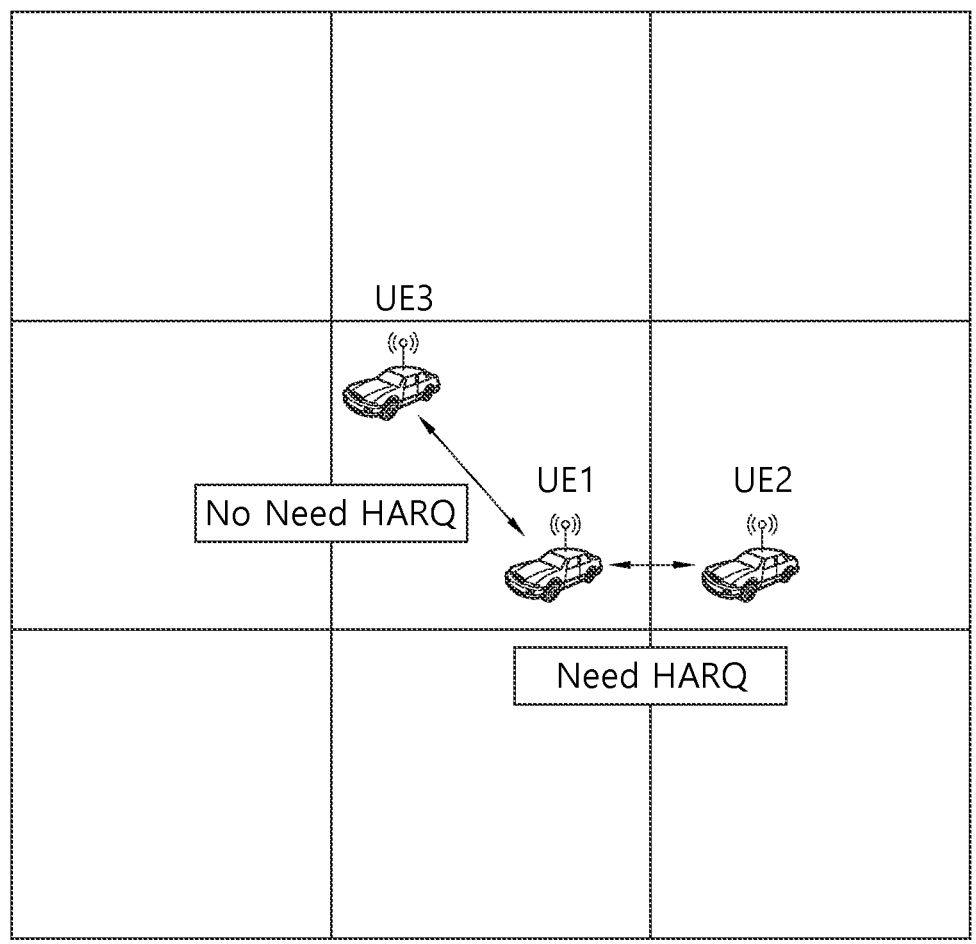
FIG. 18 is a diagram for describing problems that may occur in case a receiving UE performs HARQ feedback based on a ZONE ID transmitted from a transmitting UE.

FIG. 18 is a diagram for describing problems that may occur in case a receiving UE performs HARQ feedback based on a ZONE ID transmitted from a transmitting UE.

Referring to FIG. 18, in case UE1 is the transmitting UE, according to a ZONE ID based HARQ feedback, transmission of a HARQ feedback by another UE may be allowed only in the ZONE where UE1 belongs. However, for example, a target distance of a service being transmitted by UE1 may be shorter than a distance between UE1 and a UE (e.g., UE3) within the same ZONE. Additionally, for example, a target distance of a service being transmitted by UE1 may be longer than a distance between UE1 and a UE (e.g., UE2) belonging to a different ZONE.

In the above-described case, due to an excess in the target distance of a service, HARQ feedback may not be needed between UE1 and UE3 belonging to the same ZONE. Additionally, due to the target distance of a service, HARQ feedback may be needed between UE1 and UE2, which belongs to a different ZONE. However, according to a ZONE ID based HARQ feedback, UE3 transmits HARQ feedback on the information, which is received from UE1, to UE1, and UE2 does not transmit HARQ feedback on the information, which is received from UE1, to UE1. More specifically, according to a ZONE ID based HARQ feedback, a problem may occur, wherein HARQ feedback cannot be performed between UEs belonging to a close-ranged inter-ZONE. For example, in case the transmitting UE delivers information related to its location based on a ZONE ID, the above-described problem cannot be resolved.

Therefore, according to an embodiment of the present disclosure, the transmitting UE may signal or transmit a ZONE ID of a zone (or region) to which it belongs and a ZONE ID of a zone (or region), which is adjacent to the zone (or region) to which the transmitting UE belongs, together to a receiving UE. Accordingly, the receiving UE, which has received the ZONE ID of the zone being adjacent to the zone to which the transmitting UE belongs, may determine whether or not to perform HARQ feedback. Thereafter, the receiving UE may transmit a HARQ ACK or a HARQ NACK to the transmitting UE. At this point, for example, the receiving UE may transmit the ZONE ID of the zone to which the receiving UE belongs and the HARQ ACK or HARQ NACK together to the transmitting UE. By indicating the ZONE ID of the zone to which the receiving UE belongs to the transmitting UE, the receiving UE, the receiving UE may notify the location of the zone to which it belongs to the transmitting UE. Additionally, when the transmitting UE performs re-transmission to the receiving UE, the transmitting UE may perform beamforming (e.g., analog beamforming) towards a direction of the corresponding zone based on the ZONE ID of the zone to which the receiving UE belongs. More specifically, the transmitting UE may perform efficient re-transmission based on the ZONE ID of the zone to which the receiving UE belongs.

For example, the operation of determining, by the receiving UE, whether or not to perform HARQ feedback based on the ZONE ID may be as described below. For example, if the ZONE ID of the zone to which the receiving UE belongs is included in the ZONE ID that is received from the transmitting UE, and if a distance between the receiving UE and the transmitting UE is included in the target distance related to a service being transmitted by the transmitting UE, the receiving UE may transmit a HARQ ACK or a HARQ NACK corresponding to the service to the transmitting UE.

For example, in the above-described embodiment, when the transmitting UE transmits the ZONE ID of the zone to which it belongs and the ZONE ID of a zone being adjacent to the zone to which the transmitting UE belongs, if the signaling overhead is too large, the transmitting UE may signal or transmit only part of the ZONE IDs to the receiving UE.

Figure 19:
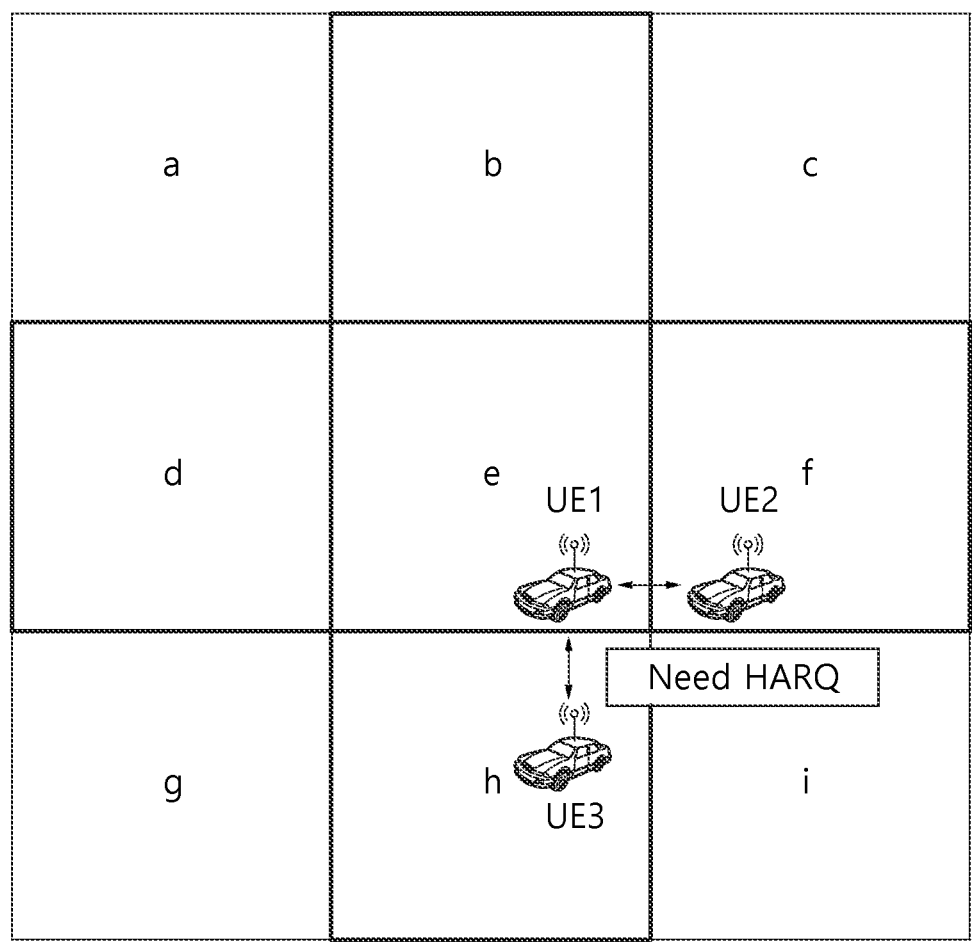
FIG. 19 shows a method for transmitting, by a transmitting UE, only part of ZONE IDs to a receiving UE, in accordance with an embodiment of the present disclosure.

FIG. 19 shows a method for transmitting, by a transmitting UE, only part of ZONE IDs to a receiving UE, in accordance with an embodiment of the present disclosure.

Referring to FIG. 19, in case UE1 is the transmitting UE, UE1 may signal or transmit a ZONE ID of a zone to which UE1 belongs and ZONE IDs of zones corresponding to an upper side, a lower side, a left side, and a right side of the zone to which UE1 belongs. For example, UE1 may signal or transmit a ZONE ID of Zone b, a ZONE ID of Zone d, a ZONE ID of Zone e, a ZONE ID of Zone f, and a ZONE ID of Zone h. In this case, for example, if the ZONE ID of a zone to which UE2 belongs is included in the ZONE IDs received from UE1, and if a distance between UE1 and UE2 is shorter than the target distance related to the service transmitted by UE1, UE2 may transmit a HARQ ACK or HARQ NACK for the service to UE1. Additionally, for example, if the ZONE ID of a zone to which UE3 belongs is included in the ZONE IDs received from UE1, and if a distance between UE1 and UE3 is shorter than the target distance related to the service transmitted by UE1, UE3 may transmit a HARQ ACK or HARQ NACK for the service to UE1. When the transmitting UE signals or transmits ZONE IDs of zones corresponding to an upper side, a lower side, a left side, and a right side of the zone to which the transmitting UE belongs, if the signaling overhead is large, the transmitting UE may transmit only the ZONE IDs of part of the zones. For example, the transmitting UE may transmit only part of a Least Significant Bit (LSB) of the ZONE IDs.

Meanwhile, according to the embodiment of FIG. 19, the HARQ operation may not be performed between UEs located in diagonal ZONEs. For example, in the embodiment of FIG. 19, even though a distance between a UE located in Zone e and a UE located in Zone i is short, a problem may occur in that the HARQ feedback operation cannot be performed between the corresponding UEs. Therefore, in order to resolve the above-described problem, the transmitting UE may transmit a ZONE ID of the zone to which the transmitting UE belongs and ZONE IDs of zones neighboring the zone to which the transmitting UE belongs.

Figure 20:
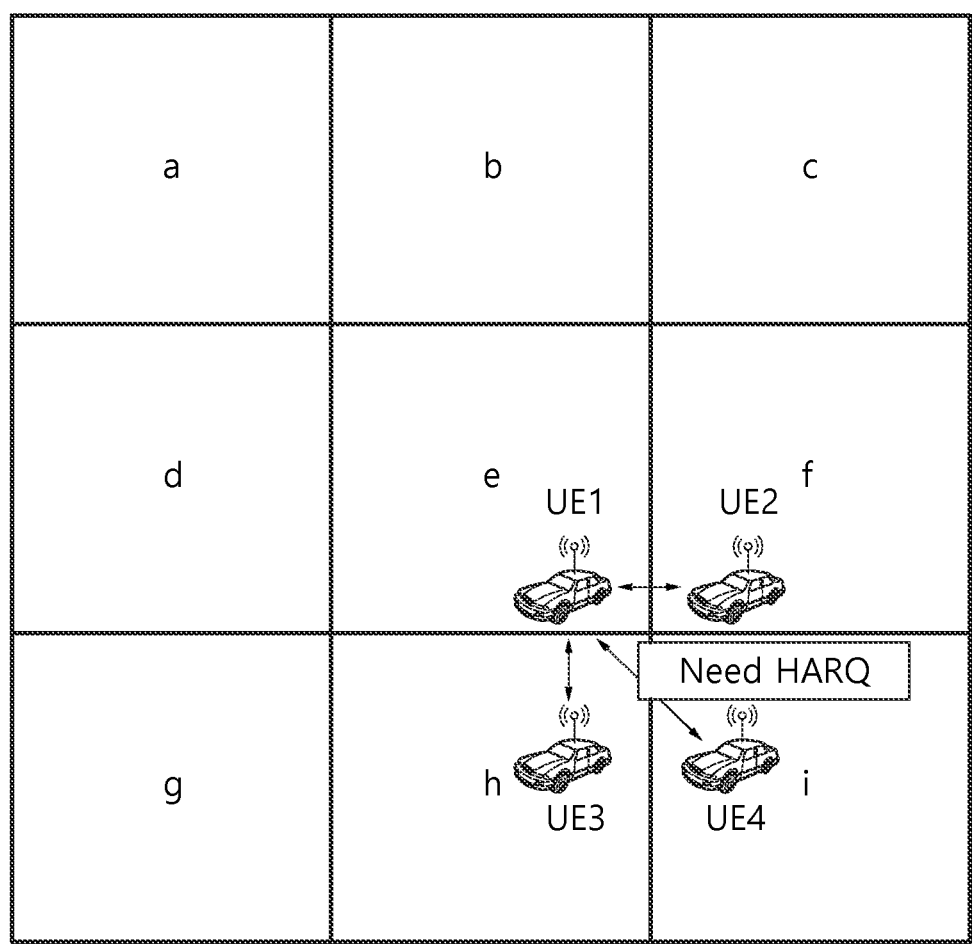
FIG. 20 shows a method for transmitting, by a transmitting UE, all ZONE IDs to a receiving UE, in accordance with an embodiment of the present disclosure.

FIG. 20 shows a method for transmitting, by a transmitting UE, all ZONE IDs to a receiving UE, in accordance with an embodiment of the present disclosure.

Referring to FIG. 20, the transmitting UE may transmit a ZONE ID of a zone to which the transmitting UE belongs and ZONE IDs corresponding to all zones neighboring the zone to which the transmitting UE belongs. For example, UE1 may transmit a ZONE ID of Zone a, a ZONE ID of Zone b, a ZONE ID of Zone c, a ZONE ID of Zone d, a ZONE ID of Zone e, a ZONE ID of Zone f, a ZONE ID of Zone g, a ZONE ID of Zone h, and a ZONE ID of Zone i. Accordingly, the receiving UE (e.g., UE2, UE3 or UE4) may determine whether or not to perform HARQ feedback by using its location and a parameter (e.g., target distance, ZONE IDs of all directions) being transmitted by the transmitting UE, and the receiving UE may transmit a HARQ ACK or HARQ NACK for the service, which is transmitted from the transmitting UE, to the transmitting UE. Similarly, in the above-described proposed method, in order to reduce the signaling overhead that may occur when the transmitting UE delivers all ZONE IDs, the transmitting UE may restrict transmission to part of the zones of the ZONE IDs.

3. Proposed Method #3

For example, if a width and/or breadth of the above-described zone is sufficiently larger (or longer) than the target distance of the service being transmitted by the transmitting UE, if the transmitting UE transmits all ZONE IDs of high granularity according to the Proposed Method #2, this may be inefficient. More specifically, for example, in the embodiment of FIG. 19, if it is assumed that the target distance of the service being transmitted by UE1 is 300 m, and that the width and/or breadth of the zone is approximately 1 km, there may be no significant meaning for UE1 to transmit a ZONE ID of Zone b, a ZONE ID of Zone d, a ZONE ID of Zone f, and a ZONE ID of Zone h. In order to resolve the above-described problem, the transmitting UE may configure or determine sub-ZONEs.

Figure 21:
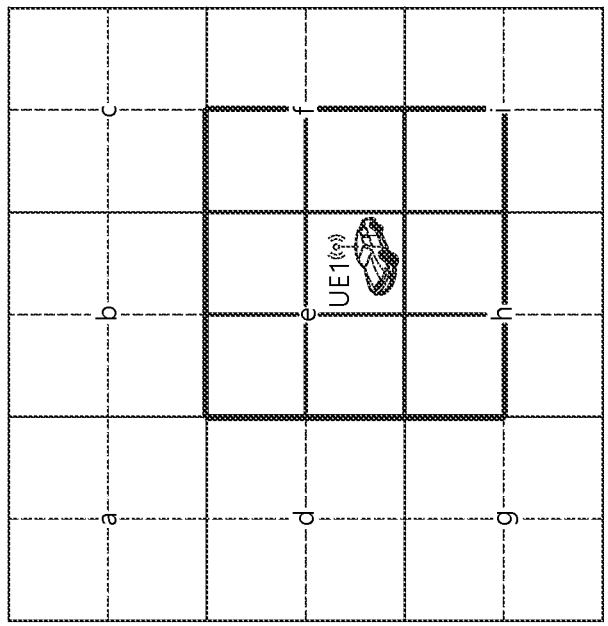
FIG. 21 shows a method for transmitting, by a transmitting UE, sub-ZONE IDs to a receiving UE, in accordance with an embodiment of the present disclosure.
Figure 21:
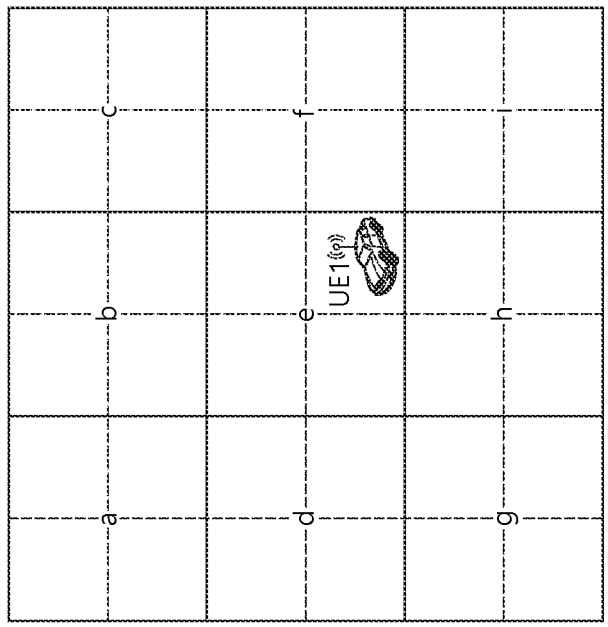

FIG. 21 shows a method for transmitting, by a transmitting UE, sub-ZONE IDs to a receiving UE, in accordance with an embodiment of the present disclosure.

Referring to FIG. 21, the ZONE may be granulated and sub-divided. For simplicity in the description, the granulated and sub-divided ZONE may be referred to as sub-ZONEs. For example, the transmitting UE may configure a new grid based on the sub-divided sub-ZONEs, and the transmitting UE may transmit an ID of a sub-ZONE to which it belongs and IDs of sub-ZONES that are adjacent to the sub-ZONE to which the transmitting UE belongs to other UE. Similarly, in the above-described proposed method, in order to reduce the signaling overhead that may occur when the transmitting UE delivers all sub-ZONE IDs, the transmitting UE may restrict transmission to part of the zones of the sub-ZONE IDs.

According to the various embodiments of the present disclosure, the receiving UE may determine whether or not to transmit HARQ feedback for the service based on an absolute distance between the transmitting UE and the receiving UE and the target distance of the service being transmitted by the transmitting UE. In this case, additionally, during the process of determining, by the receiving UE, whether or not to transmit HARQ feedback, the receiving UE may enhance accuracy in determining whether or not to transmit the HARQ feedback by using a metric (e.g., RSRP) indicating a radio distance. For example, the HARQ feedback may include a HARQ ACK or a HARQ NACK. For example, the receiving UE may determine whether or not to transmit HARQ feedback based on rough distance information (e.g., rough distance information between the receiving UE and the transmitting UE) acquired from the restricted location information transmitted from the transmitting UE and a RSRP measurement result corresponding to a message received from the transmitting UE. For example, the receiving UE may measure a RSRP corresponding to a message received from the transmitting UE, and, in case the RSRP is greater than a specific threshold value, the receiving UE may transmit a HARQ ACK or a HARQ NACK.

4. Proposed Method #4

According to an embodiment of the present disclosure, the transmitting UE may transmit information related to its location by combining at least one of Proposed Method #1 to Proposed Method #3. For example, the transmitting UE may combine information, which uses an absolute location of Proposed Method #1, and ZONE IDs of Proposed Method #2 and Proposed Method #3 and may then transmit the combined information. More specifically, for example, if the transmitting UE adds bits that roughly indicate its absolute location by using additional bits of the ZONE IDs and transmits the added bits to the receiving UE, the receiving UE may roughly determine in which location within the ZONE the transmitting UE exists.

According to the above-described various embodiments of the present disclosure, the receiving UE may determine a rough location of the transmitting UE. Additionally, the receiving UE may know the target distance of a service being transmitted by the transmitting UE and may determine whether or not to perform HARQ feedback. However, since the location information of the transmitting UE, which is transmitted by the transmitting UE, is not an accurate information, for example, in a ZONE boundary or in a high granularity (e.g., 100 km) boundary of the location information, the receiving UE may be incapable of locating the location of the transmitting UE due to the restricted information.

Figure 22:
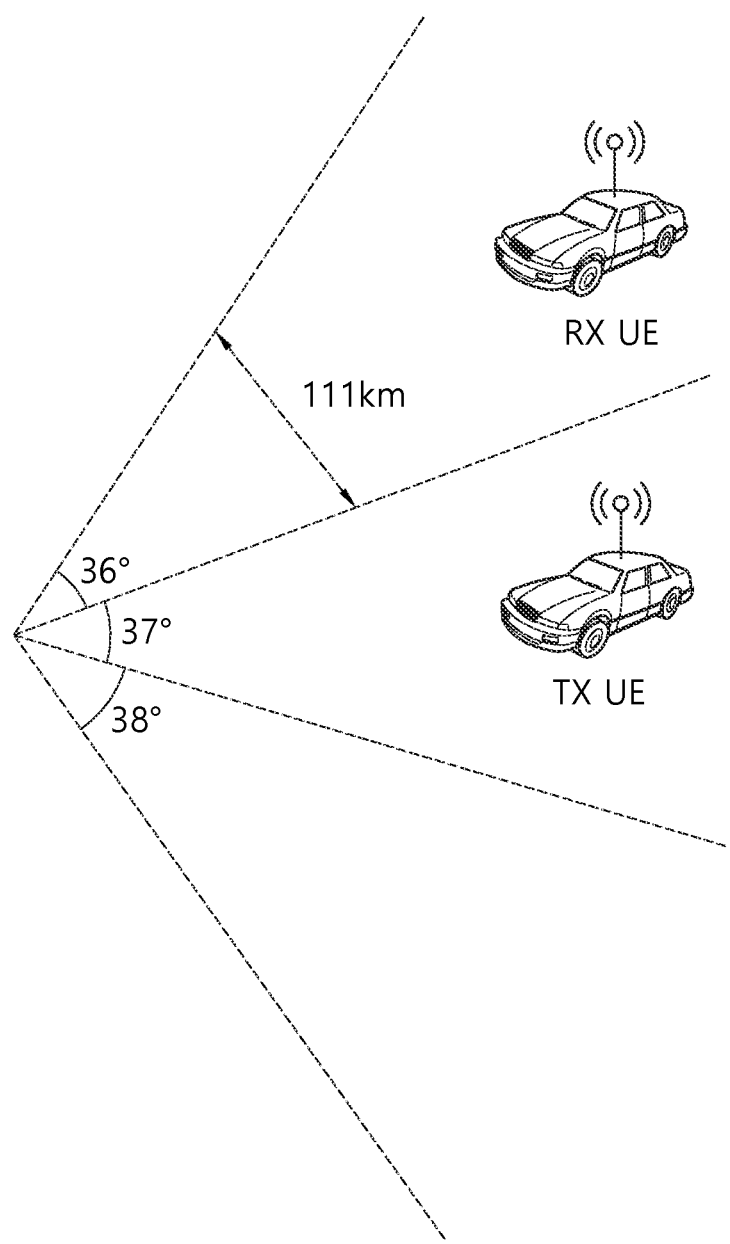
FIG. 22 is a diagram for describing a problem where a receiving UE is incapable of locating a location of a transmitting UE due to restricted information.

FIG. 22 is a diagram for describing a problem where a receiving UE is incapable of locating a location of a transmitting UE due to restricted information.

Referring to FIG. 22, it will be assumed that the transmitting UE transmits only latitude information among the absolute location information. In this case, a difference of 1 degree may indicate a distance granularity of approximately 111 km. In case each of the transmitting UE and the receiving UE is located between a boundary, and if the receiving UE receiving restricted location information from the transmitting UE, and if the receiving UE determines a location of the transmitting UE by using the restricted information from which large-scaled information is unavailable, a problem may occur in that the receiving UE may perform wrong measurement of the location of the transmitting UE.

In order to resolve the above-described problem, if it is assumed that the transmitting UE has gained long term knowledge of a location of the receiving UE by using a CAM message or discovery message, which is transmitted from the receiving UE, the transmitting UE may signal or transmit, to the receiving UE, information on an offset size of its location in a large scale from the receiving UE through a pre-defined channel. For example, the pre-defined channel may include a PSSCH and/or a PSCCH. For example, in the embodiment of FIG. 22, if the transmitting UE has known the location of the receiving UE in a long term, the transmitting UE may transmit or signal, to the receiving UE, that the transmitting UE has an offset of +1 degree from the receiving UE.

According to an embodiment of the present disclosure, in order to enhance the accuracy in its location information, the transmitting UE may transmit location information to the receiving UE through a data channel (e.g., PSSCH). For example, the location information may be additional location information. For example, the additional location information may be the remaining detailed location information that was restricted for providing the rough location information. For example, the receiving UE may determine whether or not to decode a PSSCH by using the rough location information or destination ID of the transmitting UE that is transmitted by the transmitting UE on the PSCCH. If the receiving UE successfully perform decoding of the PSSCH, the receiving UE may determine whether or not to transmit HARQ-ACK feedback corresponding to the PSSCH based on more accurate location information of the transmitting UE, which is transmitted by the transmitting UE on the PSSCH. For example, until the receiving UE performs successful decoding of the PSSCH being transmitted by the transmitting UE, the receiving UE may determine whether or not to transmit HARQ-ACK feedback based on rough location information of the transmitting UE, which is transmitted by the transmitting UE on the PSSCH.

More specifically, for example, the transmitting UE may transmit additional transmitting UE (TX UE) location information just as PUSCH UCI piggy-back and may perform decoupling of a success or failure in decoding data and a success or failure in decoding additional TX UE location information. For simplicity in the description, the additional TX UE location information may be referred to as ADD_LOINFO. For example, since UCI decoding may be independently performed by using channel coding decoupling, and so on, a success or failure in decoding data and a success or failure in decoding additional TX UE location information may be decoupled in the receiving UE.

The above-described proposed method may be effective in Groupcast Option 1. For example, the above-described proposed method may be advantageous when a NACK only feedback method, which enhances feedback resource efficiency in groupcast communication. For example, in case the receiving UE fails to decode data but successfully decodes the ADD_LOINFO, the receiving UE may finally determine whether or not to transmit HARQ NACK based on (relatively) accurate location information of the transmitting UE, which is derived by using the ADD_LOINFO. Herein, for example, the receiving UE may determine whether or not to perform decoding of the ADD_LOINFO and data based on rough location information and/or destination ID, and so on, of the transmitting UE on the PSCCH. For example, if the receiving UE fails to decode the ADD_LOINFO and data, the receiving UE may, similarly, transmit HARQ NACK to the transmitting UE by using only the information on the PSCCH. For example, if the receiving UE successfully decodes the data, regardless of the success or failure in decoding the ADD_LOINFO, the receiving UE may not transmit the HARQ feedback.

Additionally, for example, during a process of determining whether or not to decode data by the receiving UE, if the receiving UE determines a distance between the receiving UE and the transmitting UE based on the rough location information and/or ADD_LOINFO of the transmitting UE, which is/are transmitted by the transmitting UE, and if the receiving UE determines, according to the determined distance, that HARQ feedback is not needed, the receiving UE may skip the decoding of the data. More specifically, the receiving UE may not perform decoding on the data.

Additionally, in NR V2X, a Code Block Group (CBG) based re-transmission operation may be supported. In this case, the transmitting UE may transmit the ADD_LOINFO or location information of the transmitting UE to a specific CBG that is pre-defined in advance. Accordingly, after the receiving UE performs decoding on a specific CBG in which the location information of the transmitting UE is included, the receiving UE may determine whether or not to perform HARQ feedback on the remaining CBGs. For example, after the receiving UE performs decoding on a specific CBG in which the location information of the transmitting UE is included, if the receiving UE determines that the transmitting UE is located sufficiently further away from a transmission target range, the receiving UE may not perform HARQ feedback on the remaining CBGs, or the receiving UE do not attempt to perform decoding on the remaining CBGs. For example, a number of a specific CBG in which the location information of the transmitting UE is included may be regulated or configured in advance, and the number of the specific CBG may be signaled to the UE.

According to the various embodiments of the present disclosure, for the distance based HARQ operation of the receiving UE, the transmitting UE may transmit its location information to the receiving UE. For example, the transmitting UE may transmit absolute coordinates to the receiving UE, and the transmitting UE may transmit other information related to its location to the receiving UE. Herein, for example, the transmitting UE may transmit optimized information for reducing the data size that is to be transmitted or transmit refined information for notifying a rough location.

According to the various embodiments of the present disclosure, when the receiving UE determines whether or not to perform HARQ feedback based on location, the determination method of the receiving UE may vary according to the type of information that is transmitted from the transmitting UE. More specifically, the operations of the receiving UE may vary (or may be changed).

For simplicity in the description, although the location information of the transmitting UE is described mostly based on an embodiment that is used for the HARQ operation of the receiving UE, the technical spirit of the present disclosure will not be limited only to this. For example, the transmitting UE may transmit location information of the transmitting UE to the receiving UE according to various embodiments of the present disclosure, and the location information of the transmitting UE may also be used for other operations of the receiving UE instead of the HARQ operation.

Figure 23:
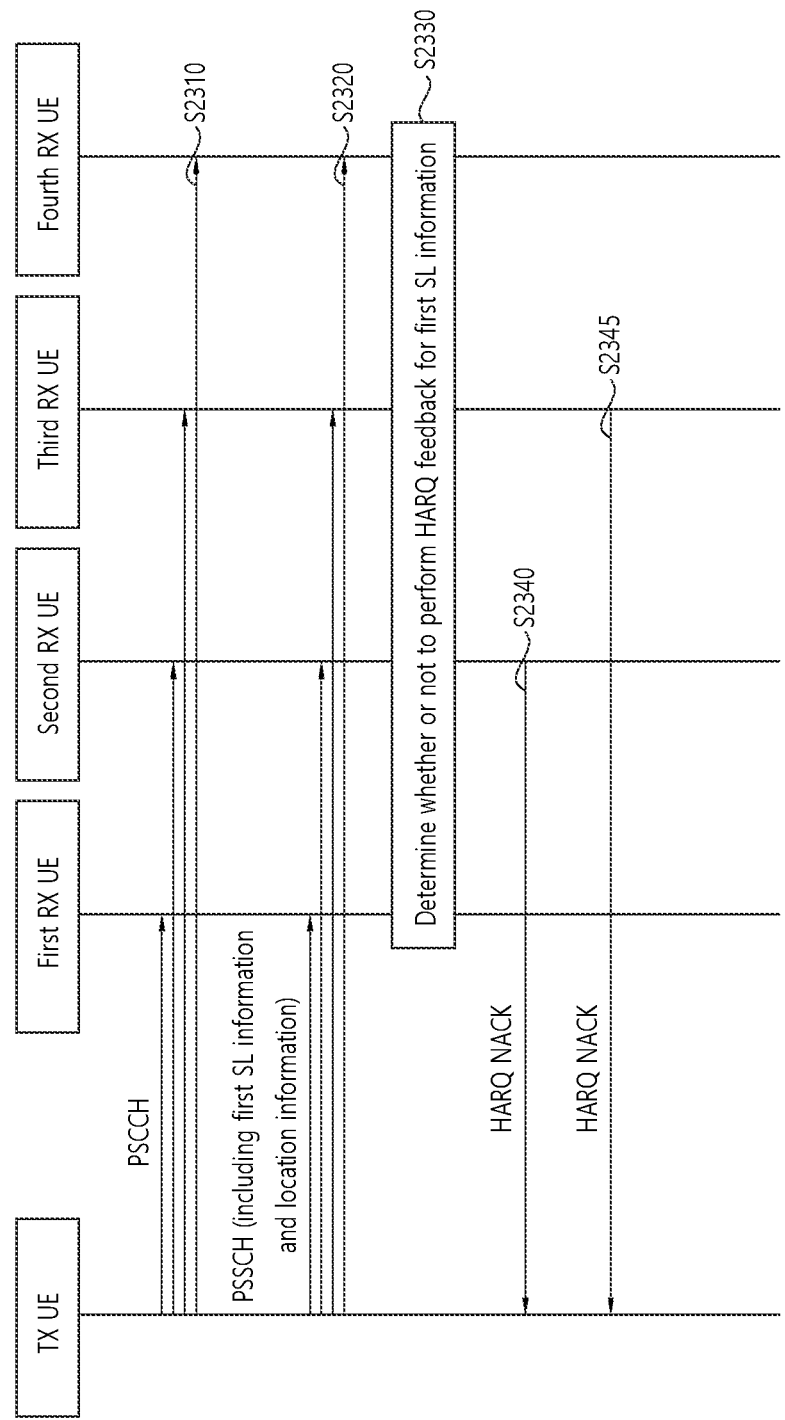
FIG. 23 shows a procedure for receiving, by a transmitting UE performing groupcast communication, HARQ feedback from one or more receiving UEs, in accordance with an embodiment of the present disclosure.
Figure 24:
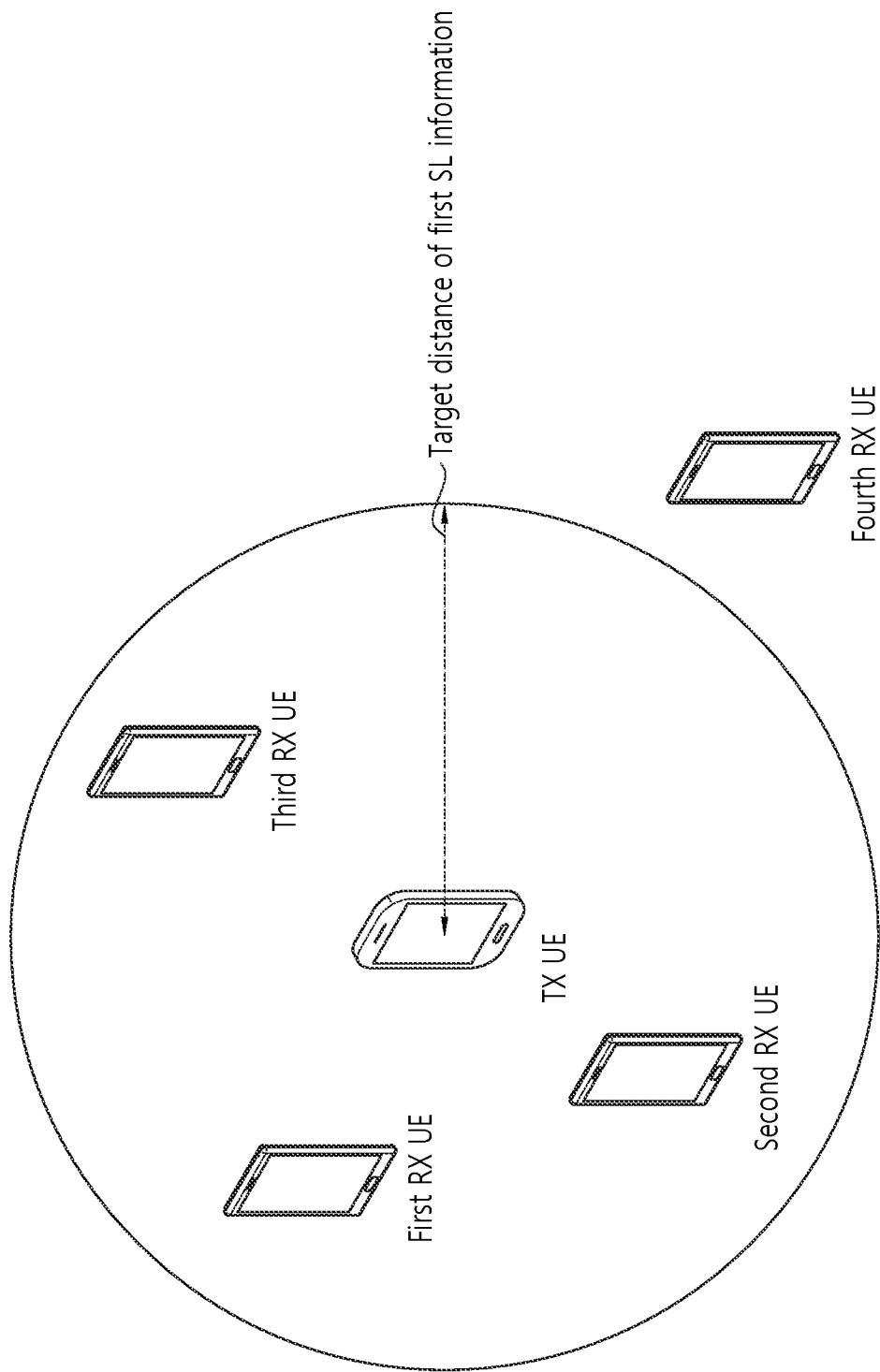
FIG. 24 shows an example of transmitting, by a transmitting UE, SL information having a specific target distance to one or more receiving UEs, in accordance with an embodiment of the present disclosure.

FIG. 23 shows a procedure for receiving, by a transmitting UE performing groupcast communication, HARQ feedback from one or more receiving UEs, in accordance with an embodiment of the present disclosure. FIG. 24 shows an example of transmitting, by a transmitting UE, SL information having a specific target distance to one or more receiving UEs, in accordance with an embodiment of the present disclosure. In the embodiment of FIG. 23, it will be assumed that locations of the transmitting UE and the one or more receiving UEs are the same as FIG. 24. Additionally, in the embodiment of FIG. 23, it will be assumed that a target distance of a first SL information is the same as FIG. 24.

Referring to FIG. 23, in step S2310, a transmitting UE may transmit a PSCCH to one or more receiving UEs. For example, the transmitting UE may perform groupcast communication with one or more receiving UEs. For example, one or more receiving UEs may include a first receiving UE, a second receiving UE, a third receiving UE, and a fourth receiving UE.

In step S2320, the transmitting UE may transmit a PSSCH to one or more receiving UEs. For example, PSSCH may be scheduled by PSCCH. For example, PSSCH may be scheduled by a SCI that is transmitted through PSCCH. For example, the transmitting UE may transmit location information of the transmitting UE to one or more receiving UEs through the PSSCH. For example, the location information of the transmitting UE may be piggy-backed on the PSSCH and may then be transmitted to the receiving UE(s). For example, the location information of the transmitting UE may be configured according to various embodiments of the present disclosure.

Additionally, the transmitting UE may transmit a first SL information to one or more receiving UEs. Additionally, the transmitting UE may transmit a target distance of the first SL information to one or more receiving UEs. For example, a target distance of the first SL information may be a communication range in which the first SL information shall be transmitted. For example, a target distance of the first SL information may be transmitted through a PSCCH that is related to the PSSCH. For example, a target distance of the first SL information may be transmitted through the PSSCH.

In step S2330, one or more receiving UEs may determine whether or not to perform HARQ feedback on the first SL information. For example, the one or more receiving UEs may calculate or acquire its distance from the transmitting UE based on location information of the transmitting UE. Additionally, the one or more receiving UEs may determine whether or not to perform HARQ feedback on the first SL information based on its distance from the transmitting UE. For example, the one or more receiving UEs may perform Groupcast Option 1 based HARQ feedback transmission.

More specifically, for example, it will be assumed that a distance between a first receiving UE and a transmitting UE is shorter than or equal to a target distance of the first SL information, and that the first receiving UE successfully receives the first SL information. In this case, according to Groupcast Option 1, the first receiving UE may not transmit HARQ ACK to the transmitting UE.

For example, it will be assumed that a distance between a second receiving UE and a transmitting UE is shorter than or equal to a target distance of the first SL information, and that the second receiving UE fails to receive the first SL information. In this case, in step S2340, according to Groupcast Option 1, the second receiving UE may transmit HARQ NACK to the transmitting UE.

For example, it will be assumed that a distance between a third receiving UE and a transmitting UE is shorter than or equal to a target distance of the first SL information, and that the third receiving UE fails to receive the first SL information. In this case, in step S2345, according to Groupcast Option 1, the third receiving UE may transmit HARQ NACK to the transmitting UE.

For example, it will be assumed that a distance between a fourth receiving UE and a transmitting UE exceeds a target distance of the first SL information. In this case, regardless of whether the fourth receiving UE successfully receives the first SL information or whether the fourth receiving UE fails to receive the first SL information, the fourth receiving UE may not transmit HARQ feedback to the transmitting UE.

Figure 25:
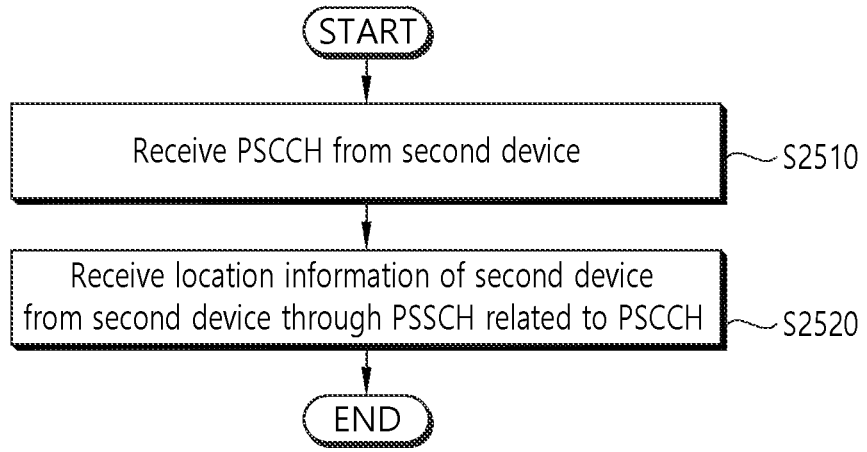
FIG. 25 shows a method for receiving, by a first device (100), location information of a second device (200), in accordance with an embodiment of the present disclosure.

FIG. 25 shows a method for receiving, by a first device (100), location information of a second device (200), in accordance with an embodiment of the present disclosure. The embodiment of FIG. 25 may be combined with various embodiments of the present disclosure.

Referring to FIG. 25, in step S2510, the first device (100) may receive a physical sidelink control channel (PSCCH) from the second device (200).

In step S2520, the first device (100) may receive location information of the second device (200) from the second device (200) through a physical sidelink shared channel (PSSCH) related to the PSCCH.

Additionally, the first device (100) may receive a sidelink service from the second device (200) through a PSSCH related to the PSCCH. Additionally, the first device (100) may receive information on a target distance related to the sidelink service from the second device (200). Additionally, the first device (100) may acquire a distance between the first device (100) and the second device (200) based on location information of the second device (200) and location information of the first device (100). Additionally, the first device (100) may determine whether or not to transmit HARQ feedback for the sidelink service to the second device (200), based on a distance between the first device (100) and the second device (200), a target distance related to the sidelink service, and whether or not the first device (100) receives the sidelink service.

For example, a distance between the first device (100) and the second device (200) may be shorter than or equal to a target distance related to the sidelink service. For example, based on a failure to receive the sidelink service by the first device (100), a hybrid automatic repeat request (HARQ) feedback for the sidelink service may be transmitted to the second device (200). Herein, for example, the HARQ feedback may be a HARQ NACK. For example, based on a successful reception of the sidelink service by the first device (100), a HARQ feedback for the sidelink service may not be transmitted to the second device (200).

Additionally, the first device (100) may determine whether or not to transmit HARQ feedback for the sidelink service to the second device (200), based on a channel status for the second device (200).

For example, the location information may include only part of the information, among the location information of the second device (200). For example, the location information may include an identifier of a zone to which the second device (200) belongs and an identifier of a zone being adjacent to the zone to which the second device (200) belongs. For example, the location information may include at least one of longitude, latitude, or altitude of the second device (200).

The above-described proposed method may be performed by a device according to various embodiments of the present disclosure. Firstly, a processor (102) of the first device (100) may control a transceiver (106) so that a physical sidelink control channel (PSCCH) can be received from the second device (200). Additionally, the processor (102) of the first device (100) may control the transceiver (106) so that location information of the second device (200) can be received from the second device (200) through a physical sidelink shared channel (PSSCH) related to the PSCCH.

Figure 26:
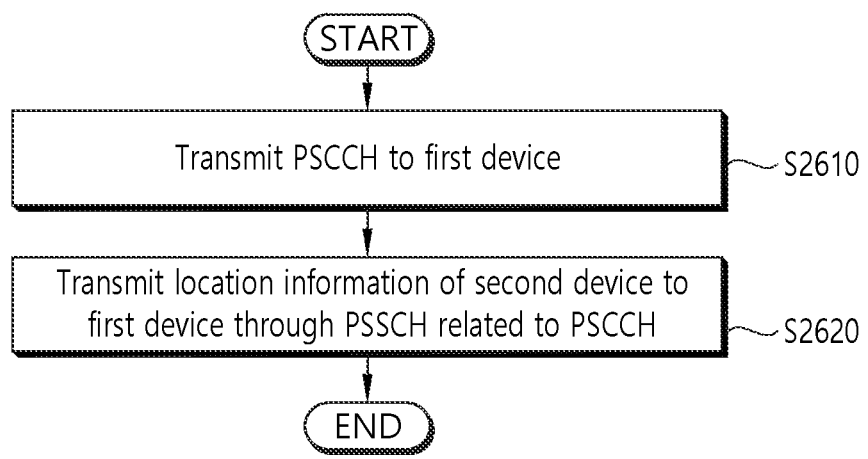
FIG. 26 shows a method for transmitting, by a second device (200), location information of the second device (200), in accordance with an embodiment of the present disclosure.

FIG. 26 shows a method for transmitting, by a second device (200), location information of the second device (200), in accordance with an embodiment of the present disclosure. The embodiment of FIG. 26 may be combined with various embodiments of the present disclosure.

Referring to FIG. 26, in step S2610, the second device (200) may transmit a physical sidelink control channel (PSCCH) to a first device (100).

In step S2620, the second device (200) may transmit location information of the second device (200) to the first device (100) through a physical sidelink shared channel (PSSCH) related to the PSCCH.

Additionally, the second device (200) may transmit a sidelink service to the first device (100) through a PSSCH related to the PSCCH. Location information of the second device (200) may be piggy-backed and transmitted on the PSSCH.

The above-described proposed method may be performed by a device according to various embodiments of the present disclosure. Firstly, a processor (202) of the second device (200) may control a transceiver (206) so that a physical sidelink control channel (PSCCH) can be transmitted to the first device (100). Additionally, the processor (202) of the second device (200) may control the transceiver (206) so that location information of the second device (200) can be transmitted to the first device (100) through a physical sidelink shared channel (PSSCH) related to the PSCCH.

The various embodiments of the present disclosure may be independently implemented. Alternatively, the various embodiments of the present disclosure may be implemented by being inter-combined or integrated. For example, although the various embodiments of the present disclosure are described based on a 3GPP system for simplicity in the description, the various embodiments of the present disclosure may also be extendedly applied to other system apart from the 3GPP system. For example, the various embodiments of the present disclosure will not be restricted only to direct communication between UEs and may also be used in uplink or downlink. At this point, a base station or relay node, and so on, may use the proposed methods according to the various embodiments of the present disclosure. For example, information on whether or not the methods according to various embodiments of the present disclosure are being applied may be defined so as to be notified through a pre-defined signal (e.g., physical layer signal or higher layer signal). For example, information on a rule according to the various embodiments of the present disclosure may be defined so as to be notified through a pre-defined signal (e.g., physical layer signal or higher layer signal) by a base station to a UE, or by a transmitting UE to a receiving UE. For example, among the various embodiments of the present disclosure, some of the embodiments may be limitedly applied only to Resource Allocation Mode 1. For example, among the various embodiments of the present disclosure, some of the embodiments may be limitedly applied only to Resource Allocation Mode 2.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, various fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 27:
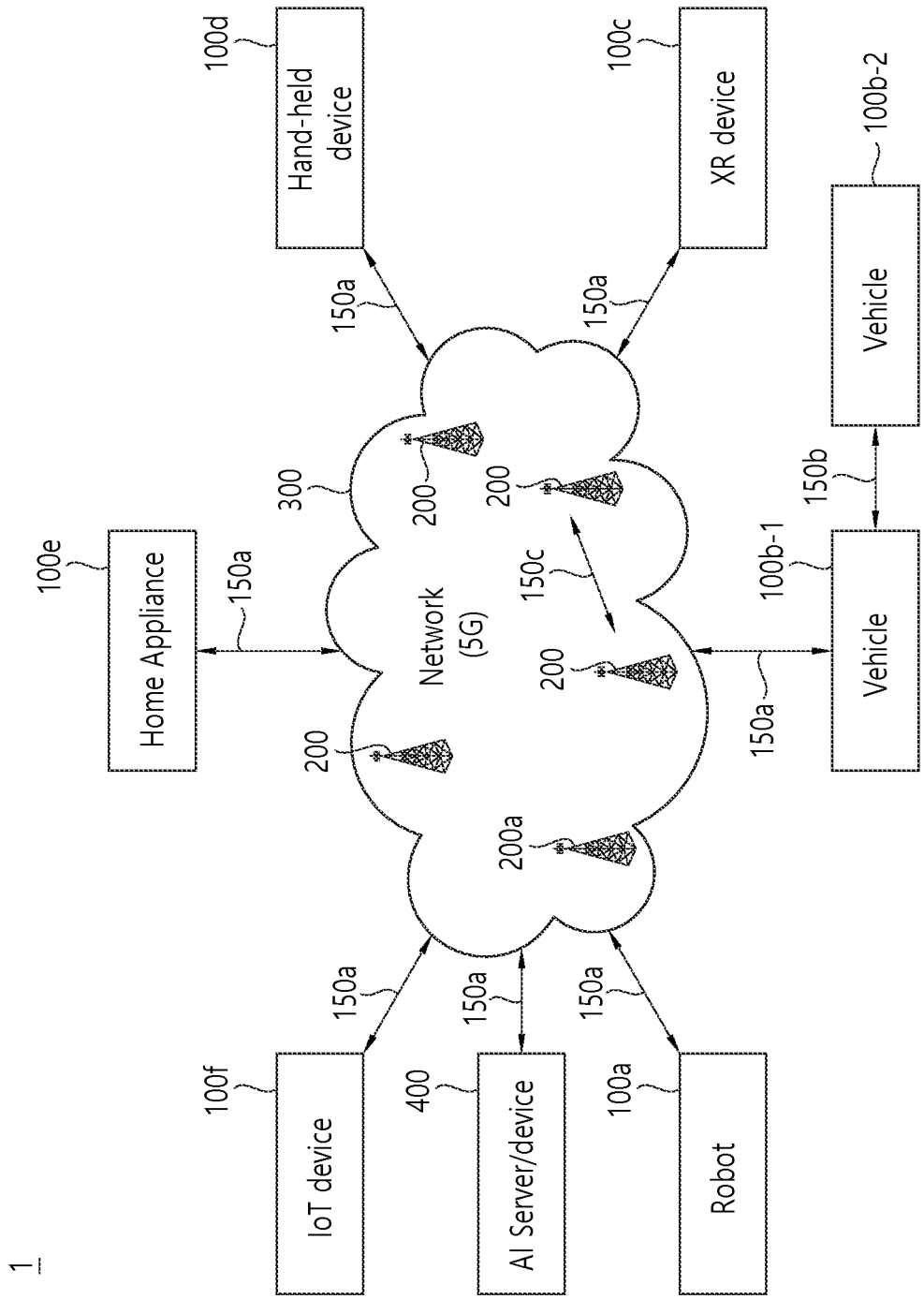
FIG. 27 shows a communication system (1), in accordance with an embodiment of the present disclosure.

FIG. 27 shows a communication system (1), in accordance with an embodiment of the present disclosure.

Referring to FIG. 27, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 28:
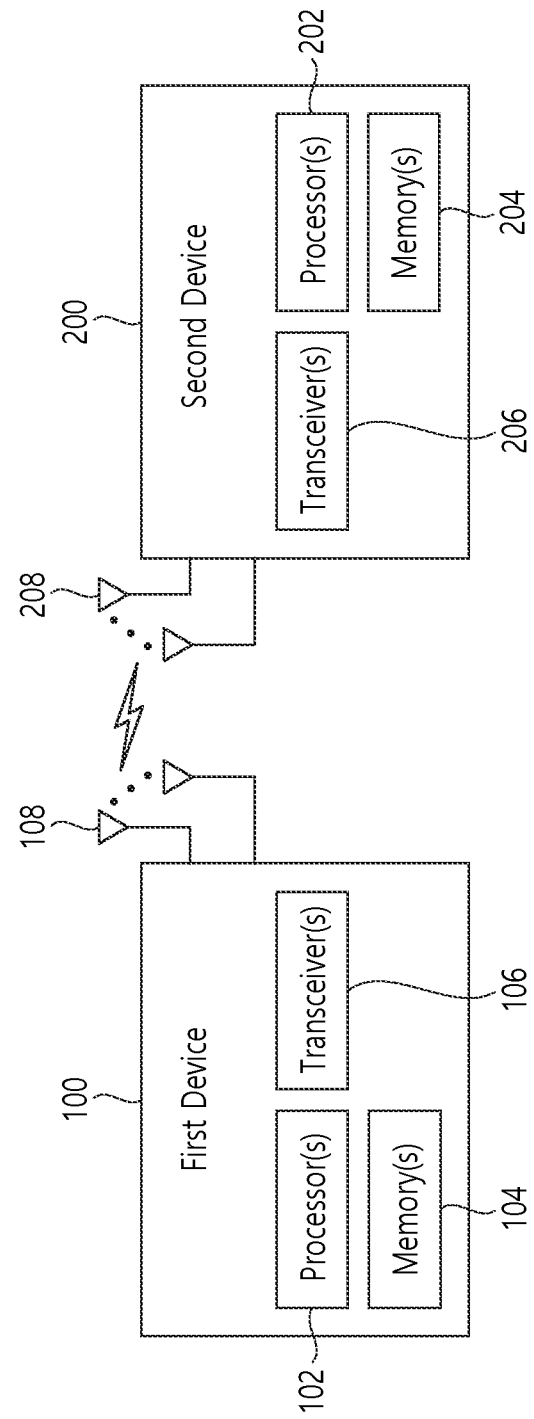
FIG. 28 shows wireless devices, in accordance with an embodiment of the present disclosure.

FIG. 28 shows wireless devices, in accordance with an embodiment of the present disclosure.

Referring to FIG. 28, a first wireless device (100) and a second wireless device (200) may transmit radio signals through various RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 27.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store various information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s)

(206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and acquire the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, etc., from RF band signals into baseband signals in order to process received user data, control information, radio signals/channels, etc., using the one or more processors (102, 202). The one or more transceivers (106, 206) may convert the user data, control information, radio signals/channels, etc., processed using the one or more processors (102, 202) from the base band signals into the RF band signals. To this end, the one or more transceivers (106, 206) may include (analog) oscillators and/or filters.

Figure 29:
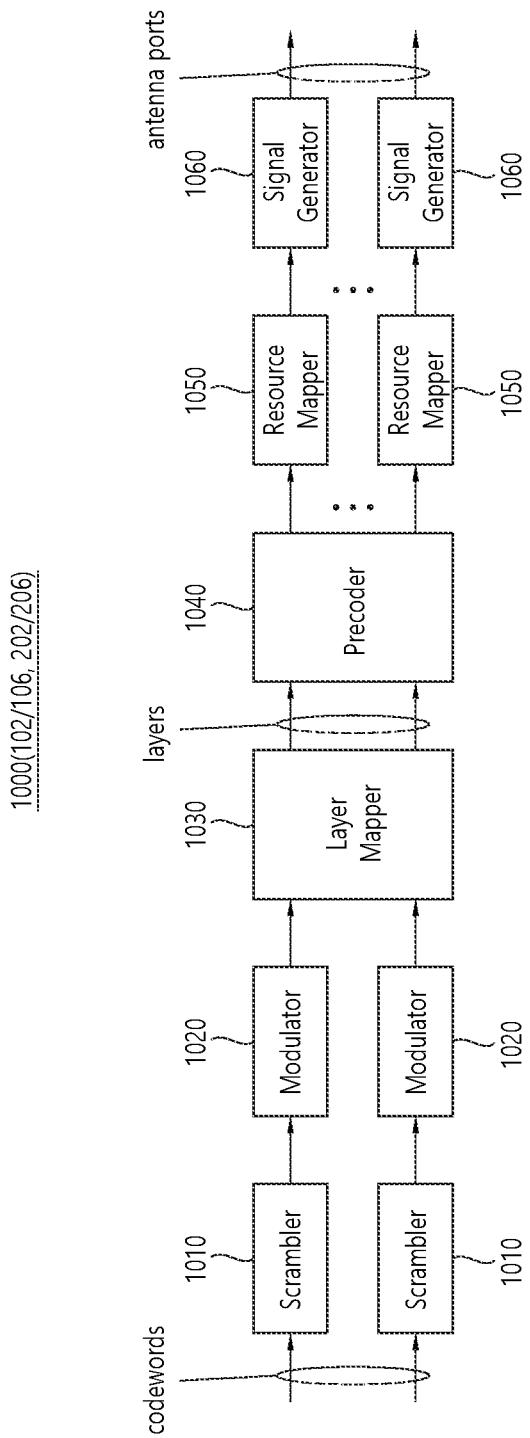
FIG. 29 shows a signal process circuit for a transmission signal, in accordance with an embodiment of the present disclosure.

FIG. 29 shows a signal process circuit for a transmission signal, in accordance with an embodiment of the present disclosure.

Referring to FIG. 29, a signal processing circuit (1000) may include scramblers (1010), modulators (1020), a layer mapper (1030), a precoder (1040), resource mappers (1050), and signal generators (1060). An operation/function of FIG. 29 may be performed, without being limited to, the processors (102, 202) and/or the transceivers (106, 206) of FIG. 28. Hardware elements of FIG. 29 may be implemented by the processors (102, 202) and/or the transceivers (106, 206) of FIG. 28. For example, blocks 1010~1060 may be implemented by the processors (102, 202) of FIG. 28. Alternatively, the blocks 1010~1050 may be implemented by the processors (102, 202) of FIG. 28 and the block 1060 may be implemented by the transceivers (106, 206) of FIG. 28.

Codewords may be converted into radio signals via the signal processing circuit (1000) of FIG. 29. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 29. For example, the wireless devices (e.g., 100, 200 of FIG. 28) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 30:
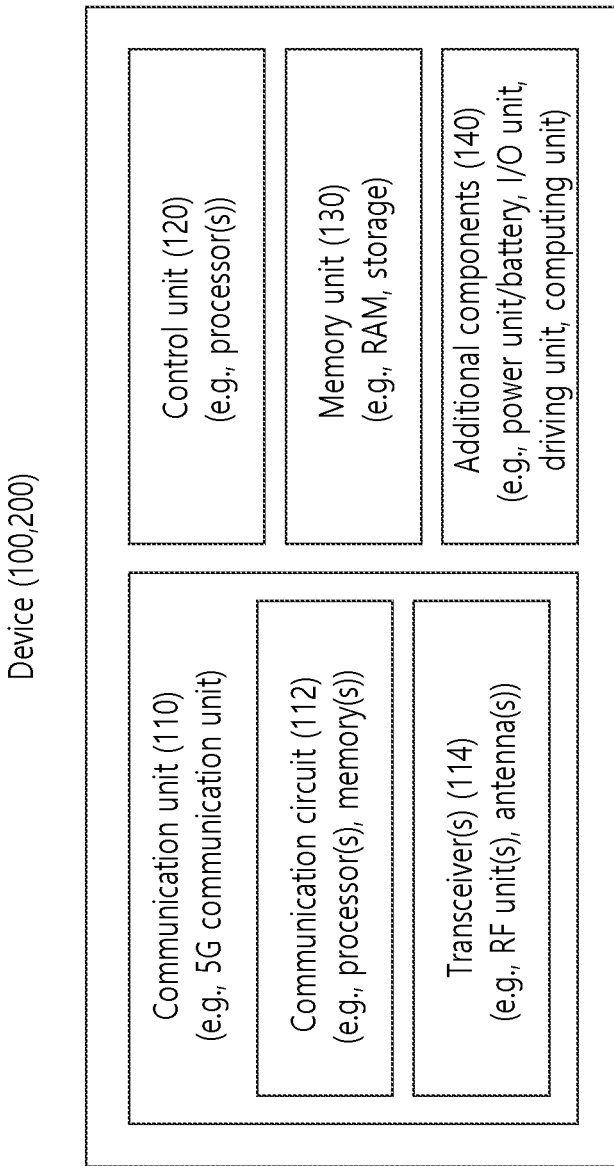
FIG. 30 shows another example of a wireless device, in accordance with an embodiment of the present disclosure.

FIG. 30 shows another example of a wireless device, in accordance with an embodiment of the present disclosure. The wireless device may be implemented in various forms according to a use-case/service (refer to FIG. 27).

Referring to FIG. 30, wireless devices (100, 200) may correspond to the wireless devices (100, 200) of FIG. 28 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 28. For example, the transceiver(s) (114) may include the one or more transceivers (106, 206) and/or the one or more antennas (108, 208) of FIG. 28. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 27), the vehicles (100b-1 and 100b-2 of FIG. 27), the XR device (100c of FIG. 27), the hand-held device (100d of FIG. 27), the home appliance (100e of FIG. 27), the IoT device (100f of FIG. 27), a digital broadcast terminal, a hologram device, a public safety device, an MTC device, a medicine device, a fintech device (or a finance device), a security device, a climate/environment device, the AI server/device (400 of FIG. 27), the BSs (200 of FIG. 27), a network node, etc. The wireless device may be used in a mobile or fixed place according to a use-example/service.

In FIG. 30, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 30 will be described in detail with reference to the drawings.

Figure 31:
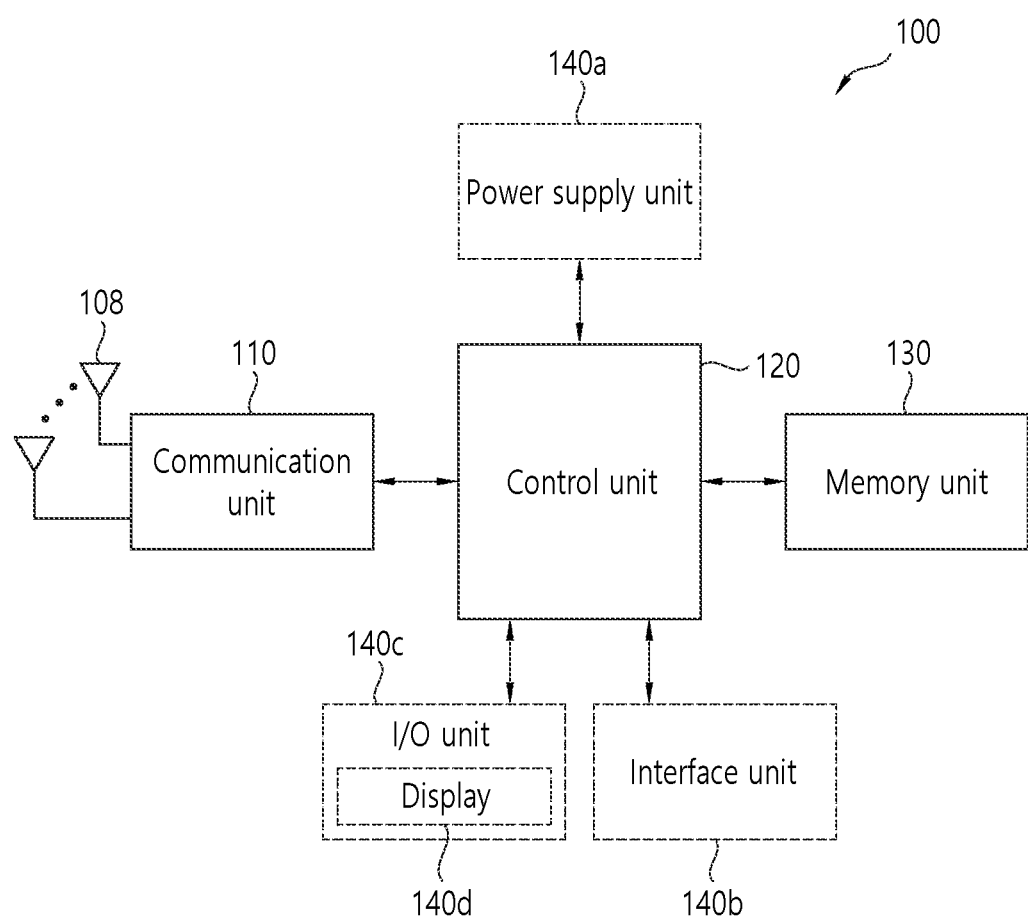
FIG. 31 shows a hand-held device, in accordance with an embodiment of the present disclosure.

FIG. 31 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 31, a hand-held device (100) may include an antenna unit (108), a communication unit (110), a control unit (120), a memory unit (130), a power supply unit (140*a*), an interface unit (140*b*), and an I/O unit (140*c*). The antenna unit (108) may be configured as a part of the communication unit (110). Blocks 110~130/140*a*~140*c* correspond to the blocks 110~130/140 of FIG. 30, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140*a*) may supply power to the hand-held device (100) and include a wired/wireless charging circuit, a battery, etc. The interface unit (140*b*) may support connection of the hand-held device (100) to other external devices. The interface unit (140*b*) may include various ports (e.g., an audio I/O port and a video I/O port) for connection with external devices. The I/O unit (140*c*) may input or output video information/signals, audio information/signals, data, and/or information input by a user. The I/O unit (140*c*) may include a camera, a microphone, a user input unit, a display unit (140*d*), a speaker, and/or a haptic module.

As an example, in the case of data communication, the I/O unit (140*c*) may acquire information/signals (e.g., touch, text, voice, images, or video) input by a user and the acquired information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140*c*).

Figure 32:
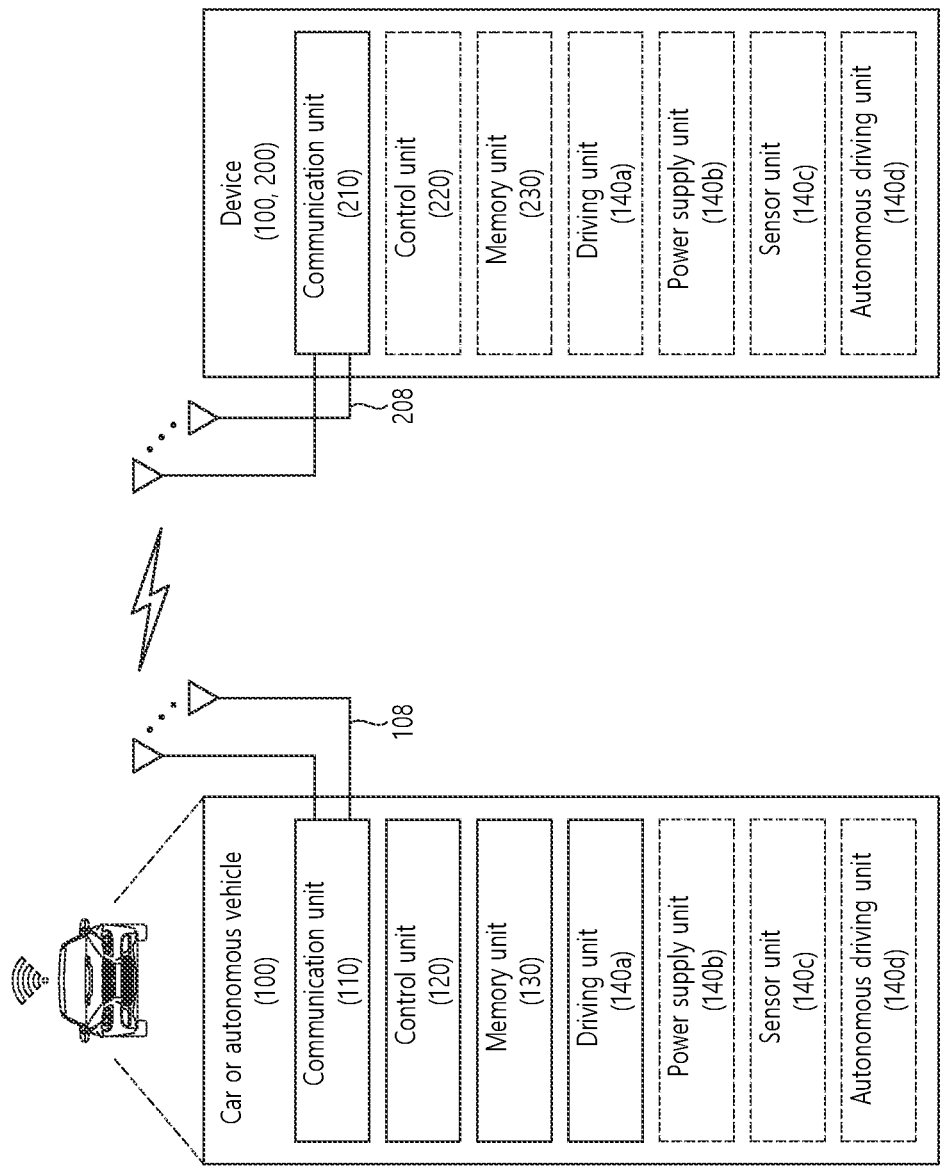
FIG. 32 shows a vehicle or an autonomous vehicle, in accordance with an embodiment of the present disclosure.

FIG. 32 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 32, a vehicle or autonomous vehicle (100) may include an antenna unit (108), a communication unit (110), a control unit (120), a driving unit (140*a*), a power supply unit (140*b*), a sensor unit (140*c*), and an autonomous driving unit (140*d*). The antenna unit (108) may be configured as a part of the communication unit (110). The blocks 110/130/140*a*~140*d* correspond to the blocks 110/130/140 of FIG. 30, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140*a*) may cause the vehicle or the autonomous vehicle (100) to drive on a road. The driving unit (140*a*) may include an engine, a motor, a powertrain, a wheel, a brake, a steering device, etc. The power supply unit (140*b*) may supply power to the vehicle or the autonomous vehicle (100) and include a wired/wireless charging circuit, a battery, etc. The sensor unit (140*c*) may acquire a vehicle state, ambient environment information, user information, etc. The sensor unit (140*c*) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit (140*d*) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, etc., from an external server. The autonomous driving unit (140*d*) may generate an autonomous driving path and a driving plan from the obtained data. The control unit (120) may control the driving unit (140*a*) such that the vehicle or the autonomous vehicle (100) may move along the autonomous driving path according to the driving plan (e.g., speed/direction control). In the middle of autonomous driving, the communication unit (110) may aperiodically/periodically acquire recent traffic information data from the external server and acquire surrounding traffic information data from neighboring vehicles. In the middle of autonomous driving, the sensor unit (140*c*) may obtain a vehicle state and/or surrounding environment information. The autonomous driving unit (140*d*) may update the autonomous driving path and the driving plan based on the newly obtained data/information. The communication unit (110) may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Figure 33:
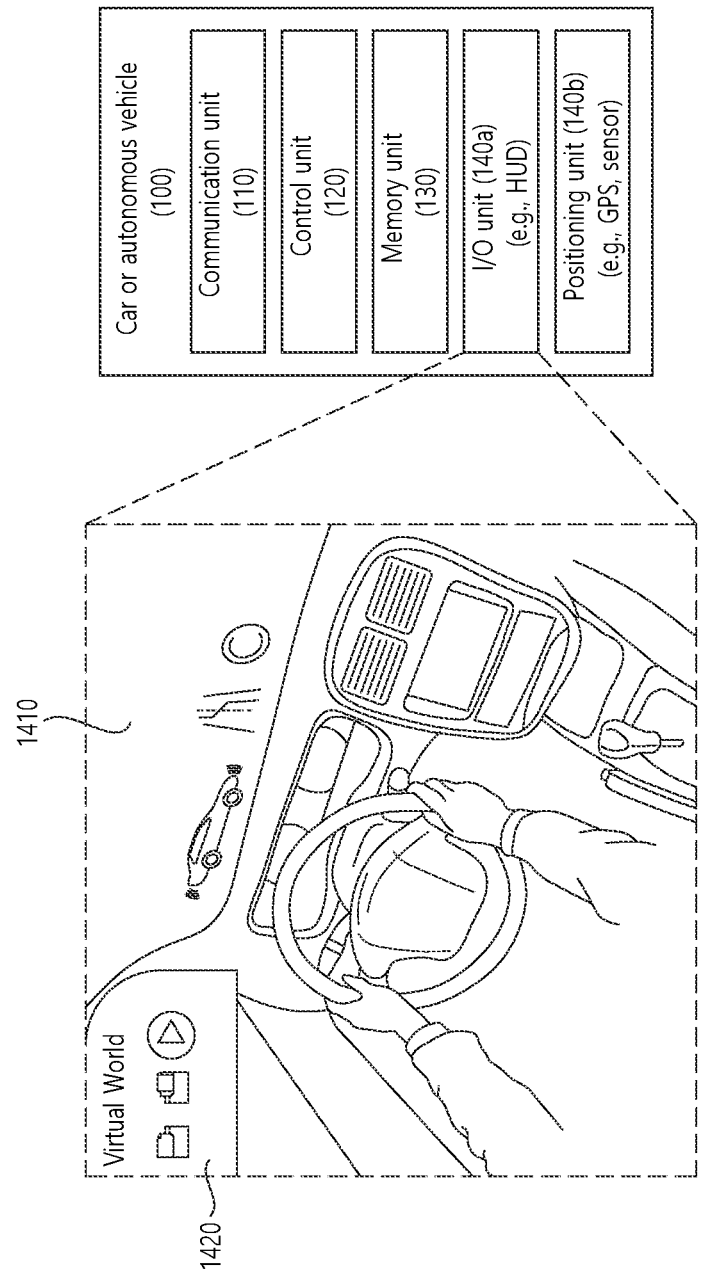
FIG. 33 shows a vehicle, in accordance with an embodiment of the present disclosure.

FIG. 33 shows a vehicle, in accordance with an embodiment of the present disclosure. The vehicle may be implemented as a transport means, an aerial vehicle, a ship, etc.

Referring to FIG. 33, a vehicle (100) may include a communication unit (110), a control unit (120), a memory unit (130), an I/O unit (140*a*), and a positioning unit (140*b*). Herein, the blocks 110~130/140*a*~140*b* correspond to blocks 110~130/140 of FIG. 30.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140*a*) may output an AR/VR object based on information within the memory unit (130). The I/O unit (140*a*) may include an HUD. The positioning unit (140*b*) may acquire information about the position of the vehicle (100). The position information may include information about an absolute position of the vehicle (100), information about the position of the vehicle (100) within a traveling lane, acceleration information, and information about the position of the vehicle (100) from a neighboring vehicle. The positioning unit (140*b*) may include a GPS and various sensors.

As an example, the communication unit (110) of the vehicle (100) may receive map information and traffic information from an external server and store the received information in the memory unit (130). The positioning unit (140*b*) may obtain the vehicle position information through the GPS and various sensors and store the obtained information in the memory unit (130). The control unit (120) may generate a virtual object based on the map information, traffic information, and vehicle position information and the I/O unit (140*a*) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140*a*). In addition, the control unit (120) may broadcast a warning message regarding driving abnormity to neighboring vehicles through the communication unit (110). According to situation, the control unit (120) may transmit the vehicle position information and the information about driving/vehicle abnormality to related organizations.

Figure 34:
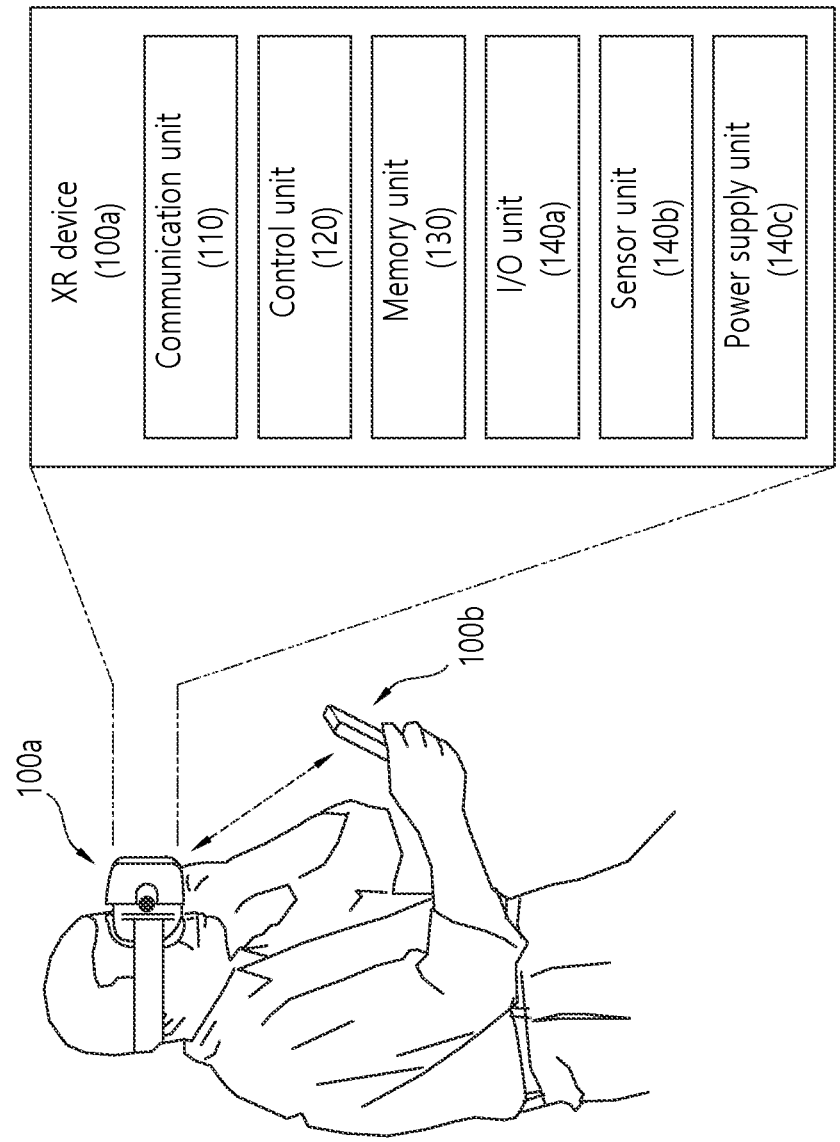
FIG. 34 shows an XR device, in accordance with an embodiment of the present disclosure.

FIG. 34 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 34, an XR device (100*a*) may include a communication unit (110), a control unit (120), a memory unit (130), an I/O unit (140*a*), a sensor unit (140*b*), and a power supply unit (140*c*). Herein, the blocks 110~130/140*a*~140*c* correspond to the blocks 110~130/140 of FIG. 30, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100*a*). For example, the control unit (120) may be configured to control and/or perform procedures such as video/image acquisition, (video/image) encoding, and metadata generation and processing. The memory unit (130) may store data/parameters/programs/code/commands needed to drive the XR device (100*a*)/generate XR object. The I/O unit (140*a*) may obtain control information and data from the exterior and output the generated XR object. The I/O unit (140*a*) may include a camera, a microphone, a user input unit, a display unit, a speaker, and/or a haptic module. The sensor unit (140*b*) may obtain an XR device state, surrounding environment information, user information, etc. The sensor unit (140*b*) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140*c*) may supply power to the XR device (100*a*) and include a wired/wireless charging circuit, a battery, etc.

For example, the memory unit (130) of the XR device (100*a*) may include information (e.g., data) needed to generate the XR object (e.g., an AR/VR/MR object). The I/O unit (140*a*) may receive a command for manipulating the XR device (100*a*) from a user and the control unit (120) may drive the XR device (100*a*) according to a driving command of a user. For example, when a user desires to watch a film or news through the XR device (100*a*), the control unit (120) transmits content request information to another device (e.g., a hand-held device (100*b*)) or a media server through the communication unit (130). The communication unit (130) may download/stream content such as films or news from another device (e.g., the hand-held device (100*b*)) or the media server to the memory unit (130). The control unit (120) may control and/or perform procedures such as video/image acquisition, (video/image) encoding, and metadata generation/processing with respect to the content and generate/output the XR object based on information about a surrounding space or a real object obtained through the I/O unit (140*a*)/sensor unit (140*b*).

The XR device (100*a*) may be wirelessly connected to the hand-held device (100*b*) through the communication unit (110) and the operation of the XR device (100*a*) may be controlled by the hand-held device (100*b*). For example, the hand-held device (100*b*) may operate as a controller of the XR device (100*a*). To this end, the XR device (100*a*) may obtain information about a 3D position of the hand-held device (100*b*) and generate and output an XR object corresponding to the hand-held device (100*b*).

Figure 35:
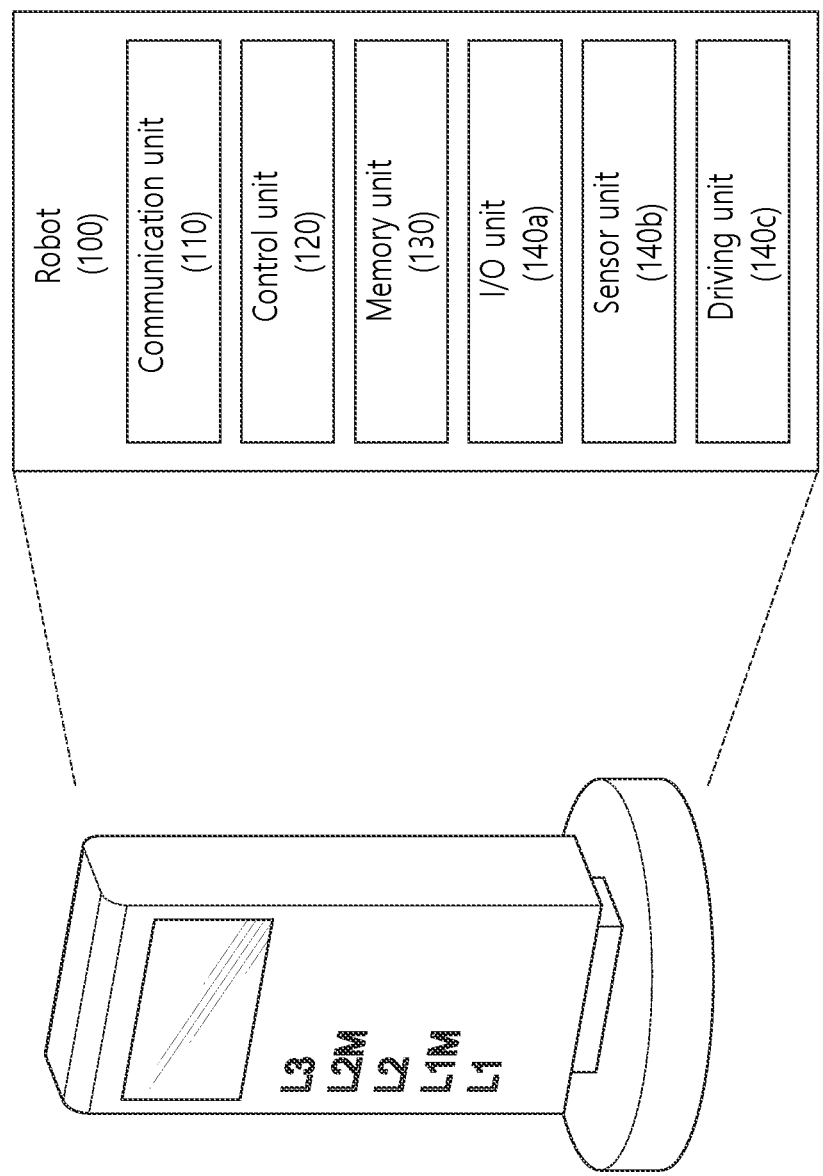
FIG. 35 shows a robot, in accordance with an embodiment of the present disclosure.

FIG. 35 shows a robot, in accordance with an embodiment of the present disclosure. The robot may be categorized into an industrial robot, a medical robot, a household robot, a military robot, etc., according to a used purpose or field.

Referring to FIG. 35, a robot (100) may include a communication unit (110), a control unit (120), a memory unit (130), an I/O unit (140*a*), a sensor unit (140*b*), and a driving unit (140*c*). Herein, the blocks 110~130/140*a*~140*c* correspond to the blocks 110~130/140 of FIG. 30, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140*a*) may obtain information from the exterior of the robot (100) and output information to the exterior of the robot (100). The I/O unit (140*a*) may include a camera, a microphone, a user input unit, a display unit, a speaker, and/or a haptic module. The sensor unit (140*b*) may obtain internal information of the robot (100), surrounding environment information, user information, etc. The sensor unit (140*b*) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit (140*c*) may perform various physical operations such as movement of robot joints. In addition, the driving unit (140*c*) may cause the robot (100) to travel on the road or to fly. The driving unit (140*c*) may include an actuator, a motor, a wheel, a brake, a propeller, etc.

Figure 36:
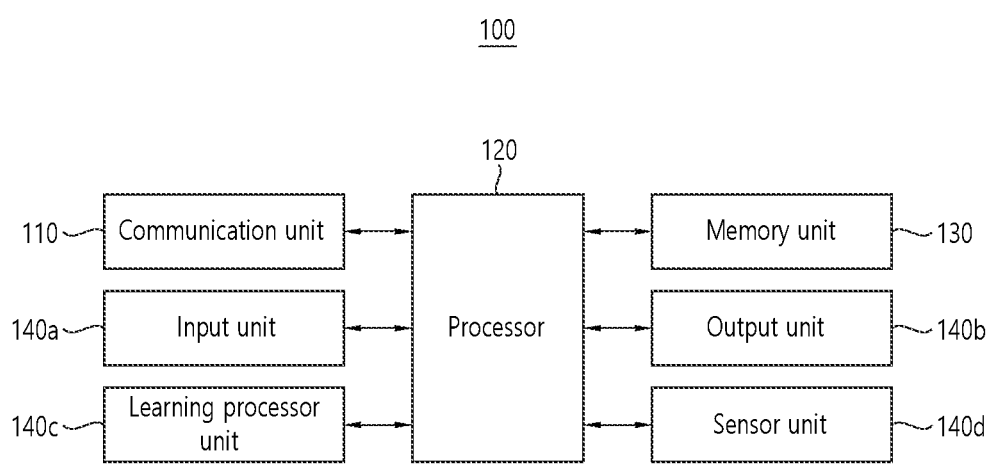
FIG. 36 shows an AI device, in accordance with an embodiment of the present disclosure.

FIG. 36 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 36, an AI device (100) may include a communication unit (110), a control unit (120), a memory unit (130), an I/O unit (140*a*/140*b*), a learning processor unit (140*c*), and a sensor unit (140*d*). The blocks 110~130/140*a*~140*d* correspond to blocks 110~130/140 of FIG. 30, respectively.

The communication unit (110) may transmit and receive wired/radio signals (e.g., sensor information, user input, learning models, or control signals) to and from external devices such as other AI devices (e.g., 100*x*, 200, or 400 of FIG. 27) or an AI server (e.g., 400 of FIG. 27) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 27). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may acquire various types of data from the exterior of the AI device (100). For example, the input unit (140a) may acquire learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 27). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
   receiving, from a second device through a physical sidelink control channel (PSCCH), sidelink control information (SCI);
   receiving, from the second device through a physical sidelink shared channel (PSSCH) related to the PSCCH, (i) an identifier (ID) of a zone in which the second device is located, (ii) information related to communication range requirement, and (iii) data;
   obtaining a distance based on location of the first device and the ID of the zone; and
   transmitting, to the second device, a negative acknowledgement (NACK) for the data, based on that (i) negative-only HARQ feedback is enabled, (ii) the distance is smaller or equal to the communication range requirement, and (iii) the data is not successfully decoded by the first device,
   wherein a positive acknowledgement (ACK) for the data is not transmitted based on that (i) the negative-only HARQ feedback is enabled and (ii) the data is successfully decoded by the first device, and
   wherein a length of the zone is configured based on the communication range requirement.

2. The method of claim 1, wherein the wireless communication performed between the first device and the second device is groupcast sidelink communication.

3. The method of claim 1, wherein information related to the location of the first device is available for the first device.

4. The method of claim 1, wherein the distance is a distance between the location of the first device and location of the zone related to the ID of the zone.

5. The method of claim 1, further comprising:
   determining whether or not to transmit the NACK for the data to the second device, based on a channel status between the first device and the second device.

6. The method of claim 1, wherein the length of the zone is configured for the first device per a communication range requirement related to the data.

7. A method for performing, by a second device, wireless communication, the method comprising:
   transmitting, to a first device through a physical sidelink control channel (PSCCH), sidelink control information (SCI);
   transmitting, to the first device through a physical sidelink shared channel (PSSCH) related to the PSCCH, (i) an identifier (ID) of a zone in which the second device is located, (ii) information related to communication range requirement, and (iii) data; and
   receiving, from the first device, a negative acknowledgement (NACK) for the data based on that (i) negative-only HARQ feedback is enabled, (ii) a distance is smaller or equal to the communication range requirement, and (iii) the data is not successfully decoded by the first device,
   wherein a positive acknowledgement (ACK) for the data is not received from the first device based on that (i) the negative-only HARQ feedback is enabled and (ii) the data is successfully decoded by the first device,
   wherein the distance is obtained based on location of the first device and the ID of the zone, and
   wherein a length of the zone is configured based on the communication range requirement.

8. The method of claim 7, wherein the wireless communication performed between the first device and the second device is groupcast sidelink communication.

9. The method of claim 7, wherein information related to the location of the first device is available for the first device.

10. The method of claim 7, wherein the distance is a distance between the location of the first device and location of the zone related to the ID of the zone.

11. The method of claim 7, wherein the length of the zone is configured for the first device per a communication range requirement related to the data.

12. An apparatus configured to control a first device, the apparatus comprising:
- at least one processor; and
- at least one memory connected to the at least one processor and storing instructions that, based on being executed by the at least one processor, perform operations comprising:
- receiving, from a second device through a physical sidelink control channel (PSCCH), sidelink control information (SCI);
- receiving, from the second device through a physical sidelink shared channel (PSSCH) related to the PSCCH, (i) an identifier (ID) of a zone in which the second device is located, (ii) information related to communication range requirement, and (iii) data;
- obtaining a distance based on location of the first device and the ID of the zone; and
- transmitting, to the second device, a negative acknowledgement (NACK) for the data, based on that (i) negative-only HARQ feedback is enabled, (ii) the distance is smaller or equal to the communication range requirement, and (iii) the data is not successfully decoded by the first device,
- wherein a positive acknowledgement (ACK) for the data is not transmitted based on that (i) the negative-only HARQ feedback is enabled and (ii) the data is successfully decoded by the first device, and
- wherein a length of the zone is configured based on the communication range requirement.

13. The apparatus of claim 12, wherein wireless communication performed between the first device and the second device is groupcast sidelink communication.

14. The apparatus of claim 12, wherein information related to the location of the first device is available for the first device.

15. The apparatus of claim 12, wherein the distance is a distance between the location of the first device and location of the zone related to the ID of the zone.

16. The apparatus of claim 12, wherein the length of the zone is configured for the first device per a communication range requirement related to the data.

* * * * *